US006826222B2

(12) United States Patent
Hill

(10) Patent No.: US 6,826,222 B2
(45) Date of Patent: Nov. 30, 2004

(54) ELECTRIC OXYGEN IODINE LASER

(76) Inventor: Alan E. Hill, 17 El Arco Dr., NE., Albuquerque, NM (US) 87123

( * ) Notice: Subject to any disclaimer, the term of this patent is extended or adjusted under 35 U.S.C. 154(b) by 0 days.

(21) Appl. No.: 10/086,030

(22) Filed: Feb. 27, 2002

(65) Prior Publication Data

US 2002/0126718 A1 Sep. 12, 2002

Related U.S. Application Data

(63) Continuation-in-part of application No. PCT/US00/23642, filed on Aug. 28, 2000.
(60) Provisional application No. 60/151,260, filed on Aug. 27, 1999, and provisional application No. 60/278,329, filed on Mar. 22, 2001.

(51) Int. Cl.[7] .............................................. H01S 3/095
(52) U.S. Cl. ............................ 372/89; 372/25; 372/34; 372/55; 315/111.21; 315/111.91
(58) Field of Search ............................ 372/25, 34, 55, 372/89; 315/111.21, 111.51, 111.91, 267, 334

(56) References Cited

U.S. PATENT DOCUMENTS

| | | | |
|---|---|---|---|
| 4,024,430 A | | 5/1977 | Schneider |
| 4,210,877 A | | 7/1980 | Pleasance et al. |
| 4,267,526 A | | 5/1981 | McDermott et al. |
| 4,549,091 A | | 10/1985 | Fahlen et al. |
| 5,023,897 A | * | 6/1991 | Neff et al. .................. 378/122 |
| 5,243,230 A | | 9/1993 | Itou et al. |
| 5,374,613 A | | 12/1994 | Noda et al. |
| 5,504,795 A | * | 4/1996 | McGeoch ................... 378/119 |
| 5,550,434 A | | 8/1996 | King et al. |
| 5,684,814 A | | 11/1997 | Hollins et al. |
| 5,892,328 A | * | 4/1999 | Shang et al. ............. 315/111.51 |
| 5,942,854 A | * | 8/1999 | Ryoji et al. ............. 325/111.21 |
| 6,051,841 A | * | 4/2000 | Partlo et al. ................ 250/504 |
| 6,414,438 B1 | * | 7/2002 | Borisov et al. ......... 315/111.31 |
| 6,416,633 B1 | * | 7/2002 | Spence ....................... 204/156 |
| 6,452,199 B1 | * | 9/2002 | Partlo et al. ................ 250/504 |
| 6,501,780 B2 | * | 12/2002 | Carroll et al. ................ 372/55 |

OTHER PUBLICATIONS

Bhawalkar, J.D., et al., "High Power Repetitive Stacked Blumlein Pulse Generators Producing Waveforms with Pulse Durations Exceeding 500 N Sec", *Digest of Technical Papers of the International Pulsed Power Conference,* Jun. 21, 1993, pp. 857–860, vol. 9, IEEE, New York.

Coogan, J.J., et al., "Production of high–energy photons from flash x–ray sources powered by stacked Blumlein generators", *Review of Scientific Instruments,* May, 1990, pp. 1448–1456, vol. 61, No. 5, American Institute of Physics, New York.

McClenahan, C.R., et al., "Repetitive, Electron–Beam Diode Development", *Digest of Technical Papers of the International Pulsed Power Conference,* Jun. 21, 1993, pp. 184–187, vol. 9, IEEE, New York.

Somerville, C., et al., "An efficient stacked–Blumlein HV pulse generator", *Measurement Science and Technology,* Sep. 1, 1990, pp. 865–868, vol. 1, No. 9, IOP Publishing, Ltd., Bristol, Great Britain.

Yamaguchi, S., et al., "Mechanical arcless dc circuit breaker by current zero operation", *Review of Scientific Instruments,* Aug. 1, 1992, pp. 3993–3999, vol. 63, No. 8, American Institute of Physics, New York.

* cited by examiner

*Primary Examiner*—David Porta
*Assistant Examiner*—Davienne Monbleau
(74) *Attorney, Agent, or Firm*—Jeffrey D. Myers; Peacock, Myers & Adams, P.C.

(57) ABSTRACT

A pulse circuit, a plasma generator, and a excited atomic molecular state generator useful in an electric oxygen iodine laser of the present invention. The invention also comprises a laser wherein a beam passes through a gas expansion throat.

9 Claims, 16 Drawing Sheets

ELECTRIC OXYGEN IODINE LASER

CROSS-REFERENCE TO RELATED APPLICATIONS

This application is a continuation-in-part application of Patent Cooperation Treaty Application Serial No. PCT/US00/23642, entitled "Electric Oxygen Iodine Laser," with an international filing date of Aug. 28, 2000, published in English under PCT Article 21(2) on Mar. 22, 2001, and the specification thereof is incorporated herein by reference. That application claimed priority to U.S. Provisional Patent Application Ser. No. 60/151,260, entitled "Electric Oxygen Iodine Laser," flied on Aug. 27, 1999, and the specification thereof is also incorporated herein by reference.

This application claims the benefit of the filing of U.S. Provisional Patent Application Ser. No. 60/278,329, entitled "Electric Oxygen Iodine Laser," filed on Mar. 22, 2001, and the specification thereof is incorporated herein by reference.

BACKGROUND OF THE INVENTION

Field of the Invention (Technical Field)

The present invention relates to lasers and pulse circuits and excited atomic state and plasma generators related thereto.

SUMMARY OF THE INVENTION (DISCLOSURE OF THE INVENTION)

The present invention comprises a pulse circuit for generating an output pulse, wherein the pulse circuit comprises a power supply; at least one Blumlein line wherein each line comprises a front end and an output end; a switch for grounding each front end of the at least one Blumlein line simultaneously; and a snubber for truncating the output pulse from the at least one Blumlein line. As described herein, this purser circuit is useful for a variety of applications. In an embodiment of this pulser circuit, the circuit further comprises at least two Blumlein lines comprising electrically connected and simultaneously groundable front ends and serially connected output ends. In another embodiment of this pulser circuit, the circuit comprises discharge electrodes for discharging the output pulse to a gas wherein each of the discharge electrodes optionally bound a tube configuration comprising a surface for heat exchange.

The present invention also comprises an inventive generator for generating an excited atomic state of a molecule. According to one embodiment, this particular generator comprises a power supply; a pulse circuit; and an excited atomic state generating region wherein the pulse circuit discharges a pulse to a gas in the region and thereby generates an excited atomic state of at least one molecule in the gas and wherein the gas optionally comprises at least one inert gas. In a particular embodiment, the excited atomic state generating region optionally comprises electrodes, a loop, or a cavity wherein the cavity optionally comprises a resonant cavity or a capacitively coupled cavity (particularly useful for RF and microwave energy deposition). In another embodiment, the excited atomic state generating region optionally comprises a loop and at least two electrodes. In yet another embodiment, the excited atomic state generator optionally comprises an excited atomic state generating region comprising a loop and at least one transformer core comprising at least one winding wherein the excited atomic state generating region loop forms a second winding of the at least one transformer core. In many of the embodiments of the present invention, particularly the generator and laser embodiments, removal of heat from the system is useful. For example, one embodiment of the generator comprises an excited atomic state generating region that further comprises a component of a heat exchanger.

The present invention also comprises a laser. In one embodiment, the laser comprises a power supply; a pulse circuit; an excited atomic state generating region wherein the pulse circuit discharges a pulse to a gas in the region and thereby generates an excited atomic state of at least one molecule in the gas and wherein the gas optionally comprises at least one inert gas; and a resonant cavity for generating a laser beam. In a particular embodiment, the laser optionally comprises a heat exchanger for controlling the temperature of said excited atomic state generating region; and optionally comprising supersonic expansion nozzles for introducing the gas into the excited atomic state generating region.

The present invention also comprises several inventive methods. For example, the present invention comprises a method of generating a plasma. In one embodiment this method comprises the steps of: a) providing a gas; b) applying a pulse to the gas to over-volt the gas to an E/N value above ionization breakdown thereby forming a plasma; c) applying additional pulses, above ionization breakdown of the gas, to sustain quasi-continuous ionization of the plasma; and d) causing a current flow to the plasma by applying an electric field comprising an E/N value less than the glow potential of the plasma. In a particular embodiment of this method the gas comprises $O_2$ and the method generates an excited atomic state Of $O_2$ and optionally wherein the excited atomic state comprises $O_2{}^1\Delta$.

The present invention also comprises a method for producing a laser beam. In one embodiment, this laser method comprises the steps of: a) providing a gas; b) applying a pulse to the gas to over-volt the gas to an electric field normalized to plasma density value above ionization breakdown thereby forming a plasma; c) applying additional pulses, above ionization breakdown of the gas, to sustain quasi-continuous ionization of the plasma; d) causing a current flow to the plasma by applying an electric field comprising an electric field normalized to plasma density value less than the glow potential of the plasma; e) contacting the plasma with a molecule of the gas to generate an excited atomic state of that molecule; f) contacting the excited molecule with iodine to excite the iodine; and g) lasing the excited iodine.

The present invention also includes a laser comprising a gas, a beam produced by the gas and a throat wherein the gas and beam pass through the throat. In one embodiment, the throat comprises a converging region and a diverging region to achieve supersonic flow of gas passing therethrough. This particular embodiment is optionally useful when a lasing molecule is capable of repetetive cycling over the length of a cavity. While iodine is suitable as a lasing molecule, this embodiment is not limited specifically to iodine.

A primary object of the present invention is to enable an electric oxygen iodine laser.

A primary advantage of the present invention is an efficient laser.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 6b is a diagrammatic view of a housing of an embodiment for housing a tube bank, such as that shown in FIG. 6a;

FIG. 8c is a diagrammatic top view of the laser shown in FIG. 8a;

Figure 1:
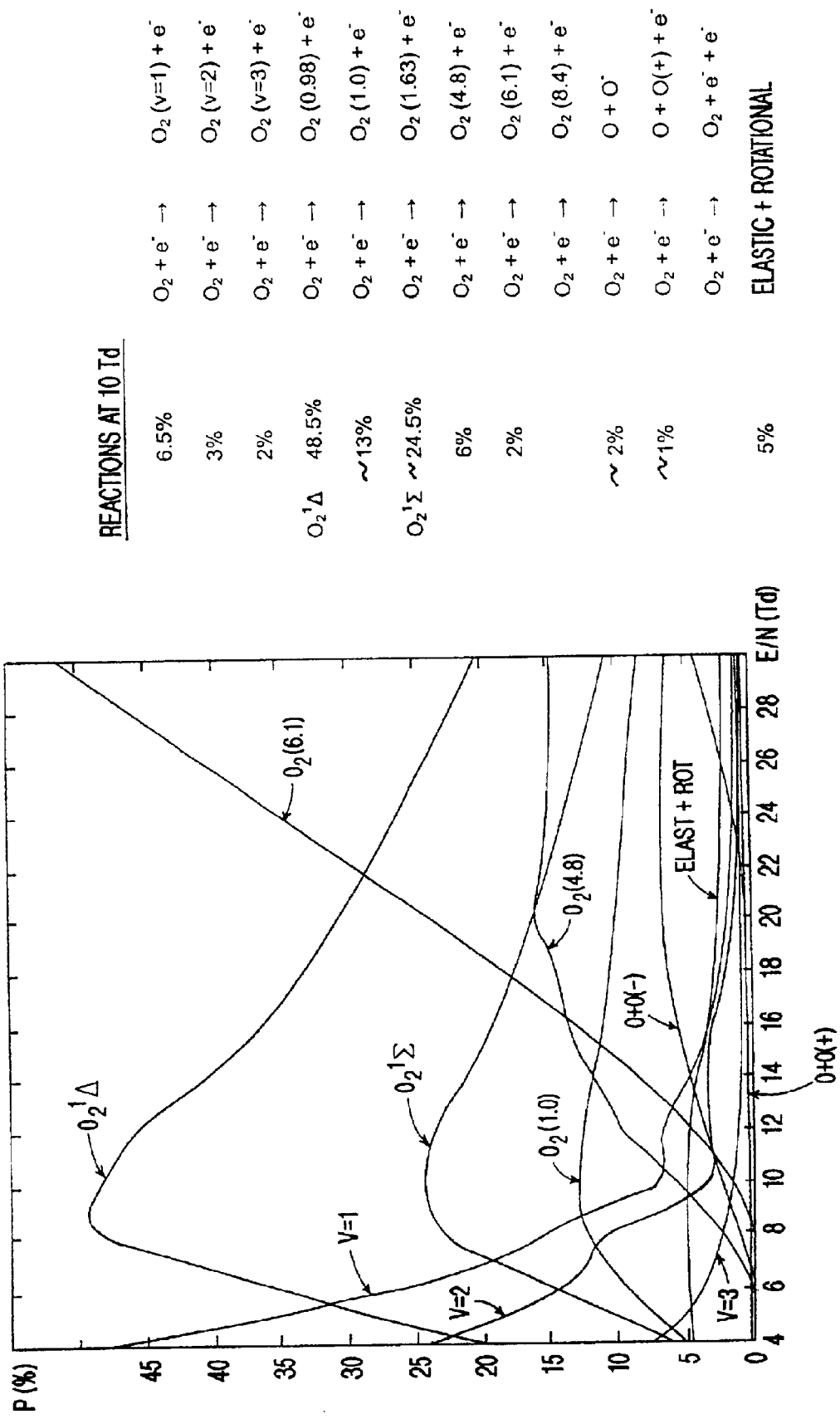
FIG. 1 is a graph of a variety of reactions versus E/N in Townsend.

DESCRIPTION OF THE PREFERRED EMBODIMENTS (BEST MODES FOR CARRYING OUT THE INVENTION)

The present invention pertains to pulse circuits, generation apparatus and methods of generating plasma and/or excited atomic molecular species, and lasers. The pulse circuits of the present invention comprise means for generating ultra-short pulses suitable for use in lasers. The generation apparatus and methods of the present invention comprise means for generating plasma and/or excited atomic molecular species. For example, various embodiments of the generators of the present invention are useful for exciting molecules to excited atomic states, wherein such molecules include, but are not limited to, oxygen, water, carbon monoxide, carbon dioxide, nitrogen, NO, $NO_x$, chlorine, flourine, bromine, etc. This list is not exhaustive nor exclusive but given to show that the present invention is not limited to excitation of oxygen molecules. While the embodiments that follow focus primarily on excitation of oxygen and/or generation of a plasma in the presence of oxygen, it would be understood by one of ordinary skill in the art of physical chemistry that the apparatus and methods of the present invention are useful for generating plasma and exciting chemicals other than oxygen. Likewise, the pulse circuit of the present invention has uses other than for generator apparatus and/or lasers.

Particular embodiments of the present invention pertain to oxygen-iodine laser systems for use in a variety of industrial applications including metal-working applications such as cutting, welding, drilling, and surface modification. Currently, $CO_2$ and NdYag type lasers are used for such metal-working applications. $CO_2$ lasers possess good beam quality, high efficiency, scalability to very high power levels (without loss of beam quality), and are an economical source of laser power on a per watt basis; however, they suffer from a long wavelength (10.6 microns) and, therefore, cannot be focused to a tight spot at high power levels without causing plasma formation. The long wavelength also prevents transmission via fiber optic cable and limits the ability to cut thick steel precisely and efficiently. Ultimately, a $CO_2$ laser cannot cut or weld steel more than a few inches deep. NdYag lasers operate at a much shorter wavelength, 1.06 microns, which is transmittable via fiber optic cable. The 1.06 micron NdYag wavelength beam, in combination with a suitable lens, allows for beam focusing to a spot area 100 times smaller, at 100 times greater beam intensity, compared to a 10.6 micron $CO_2$ wavelength beam. In general, the smaller wavelength beam of the NdYag laser does not cause plasma formation until reaching an intensity level that is 100 fold that of the level which causes air breakdown for the $CO_2$ laser (i.e., $10^9$ watts/cm$^2$ for NdYag verses $10^7$ watts/cm$^2$ for $CO_2$); however, maintenance of beam quality is a major problem of NdYag lasers scaled to a high average power—high power allows for an increase in work process rate. For example, a 2 KW to 3 KW multi-mode NdYag laser produces a focal spot that is blurred to a 1000 fold greater area than that produced by a 60 watt diffraction limited NdYag laser. Increased focal spot size also leads to heat loss to the sidewalls of the laser's "keyhole" cut—such heat loss can be a limiting factor in many cutting applications.

The oxygen-iodine laser systems of the present invention combine advantages of $CO_2$ and NdYag lasers while eliminating many of their disadvantages. An oxygen iodine ($O_2$—I*) laser operates at 1.315 microns and is thereby transmittable by fiber optic cable. The 1.315 micron wavelength allows for beam focusing characteristic of NdYag lasers operated below 60 watts average power. Likewise, the $O_2$—I* laser achieves an intensity of nearly $10^9$ watts/cm$^2$ without causing plasma formation or losing beam quality. Essentially, the $O_2$—I* laser is scalable to tens or hundreds of kilowatts—megawatts for that matter—without loosing beam quality. This allows for a sharp focus at high power. For example, $O_2$—I* laser systems of the present invention can cut easily through 12 inch-thick steel because such systems deliver a power density that is orders of magnitude higher than the rate at which the steel absorbs energy through the keyhole walls. A more detailed description of $O_2$—I* laser systems of the present invention follows.

$O_2$—I* laser systems of the present invention deviate from traditional chemical $O_2$—I* laser systems (COIL systems). Traditional COIL systems require liquid chlorine, concentrated hydrogen peroxide, and potassium hydroxide. During operation, these chemicals are provided at a substantial rate and mixed to form a chemical reaction that produces oxygen in a particular excited state called $O_2{}^1\Delta$ (O-2 singlet delta). In COIL systems, a flowstream of $O_2{}^1\Delta$ passes through a chilled heat exchanger to remove water vapor—an unwanted by-product of the chemical reaction. Next, the $O_2{}^1\Delta$ flowstream passes through a block of helium and iodine injection nozzles, then supersonic expansion nozzles that accelerate and cool the oxygen/helium/iodine stream to about Mach 2.8 and about 100 K. The $I_2$, which may be carried in buffer gas (e.g., helium), is generally mixed into the $O_2$ and $O_2{}^1\Delta$ flowstream just upstream of the supersonic expansion nozzles.

During this process, $I_2$ molecules collide with $O_2{}^1\Delta$ and disassociate into two iodine atoms. The individual iodine atoms, in turn, collide with additional $O_2{}^1\Delta$ molecules whereby energy stored in $O_2{}^1\Delta$ molecules is then transferred to iodine atoms. The transfer of energy causes a "populating" of the iodine's upper laser level. The change in energy level process is positioned to occur either just upstream of, or within, an optical resonator which is transverse to the supersonic flowstream. The $O_2$—I* laser beam is produced and directed transverse to the supersonic flowstream by the optical resonator. The chemical flowstream, post-resonantor, passes through a supersonic/subsonic diffuser that causes a "shock down" to subsonic flow. The subsonic chemical stream is simply discharged from the system, for example, to the atmosphere, usually with the aid of an ejector pump. The aforementioned COIL system operates in an open-cycle configuration because the chemicals pass through the system only once.

Figure 9:
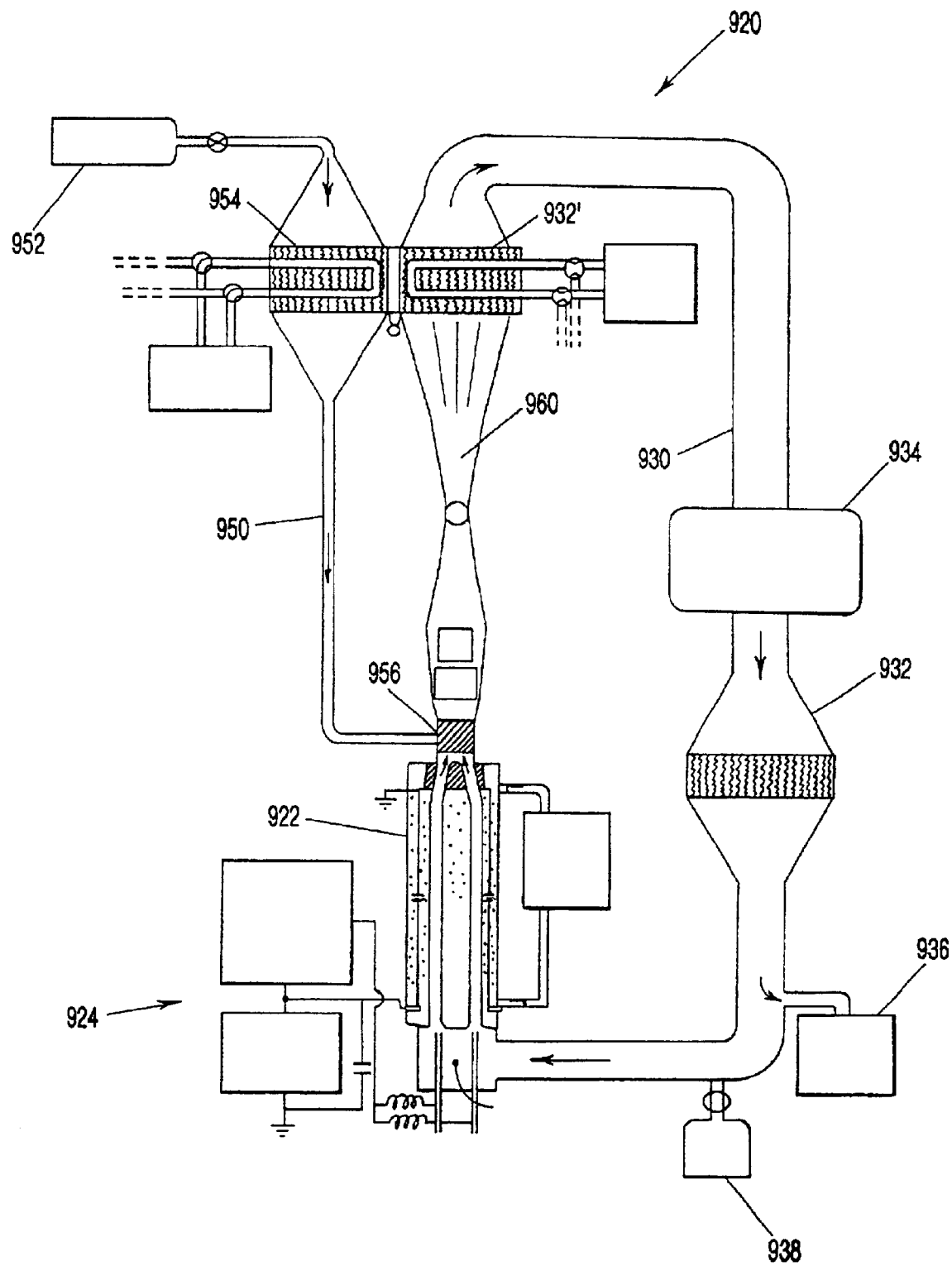
FIG. 9 is a diagrammatic view of a close-cycle laser according to an embodiment of the present invention.

The present invention encompasses both open-cycle and closed-cycle configurations; however, as shown below, closed-cycle configuartions impart substantial benefits to some industrial applications, as do semi-closed cycle configurations. The present invention allows for a semi closed-cycle operation by virtue of electrical excitation of oxygen. For purposes of this invention, semi closed-cycle operation means that less than approximately 10% of system gas is lost as percentage of gas flow rate and preferably, this percentage is less than approximately 5% while most preferably, this percentage is less than approximately 1%. Electrical excitation eliminates the need for liquid chlorine, concentrated hydrogen peroxide, and potassium hydroxide. In the preferred embodiments of the present invention, electricity alone energizes the laser, transforming pure oxygen into $O_2{}^1\Delta$. Semi closed-cycle operation of a preferred embodiment of the present invention's $O_2$—I* laser system is illustrated in FIG. 9.

Unlike the COIL system, the closed-cycle operable, electrically driven system of the present invention allows for design of practical systems for industrial applications. For example, electrically driven $O_2$—I* systems of the present invention comprise a laser that operates at 1.315 microns having the physical size, cost per watt, power scalability, and beam quality advantages of a closed-cycle, fast-flow $CO_2$ laser system.

A preferred embodiment of a particular laser system of the present invention shares some operational similarities with a United States Air Force COIL system. The Air Force COIL system first provides for $I_2$ collisions with $O_2{}^1\Delta$ that disassociate $I_2$ into 2I and second, provides for additional iodine collisions with metastable oxygen whereby energy is resonantly transferred to iodine thereby exciting the iodine to the upper laser level. The most significant difference between the aforementioned preferred embodiment and the Air Force COIL system is that instead of producing the oxygen singlet delta from a chemical reaction of basic hydrogen peroxide and chlorine, the oxygen singlet delta is produced directly from ground-state oxygen by means of cold plasma electrical excitation.

Normally, the required fractional conversion of oxygen into $O_2{}^1\Delta$ cannot be accomplished by using either conventional (self-sustained) discharges or microwave discharges, because in both instances heat production is excessive and limiting, and also the electric field ("E-field") normalized to plasma density ("E/N") values encountered are much too high. More specifically, E/N is a measure of the E-field normalized to the plasma density, which plays a controlling role in nearly all plasma processes. E/N is typically measured in Townsends 1 Td (1 Townsend)=10–17 volt-$cm^2$, a value equivalent to 263.9 volts/cm-Amagat. Therefore, an insufficient fraction of the input energy gets partitioned into the single reaction product of importance: $O_2{}^1\Delta$. Chemical kinetics/Boltzman electron energy distribution calculations reveal that the necessary concentrations of $O_2{}^1\Delta$ are generated only if the following (normally mutually exclusive) conditions are simultaneously met:

(1) A high specific energy deposition (approximately 100 KJ/mole $O_2$) must be applied to a large volume, low pressure (approximately 5 to 50 Torr) flowstream of oxygen. For instance, the system requires a volume that is scalable to produce whatever $O_2{}^1\Delta$ flowrate is required for a laser of specific power (e.g., a 100 KW laser might require on the order of 43 liters of total plasma volume, if operated at 15 Torr total stagnation pressure);

(2) The energy deposition must occur within approximately 10 milliseconds or less (generally due to kinetic losses);

(3) The electric field must be maintained well below the glow potential so that E/N values lie between approximately 7 and approximately 10 Townsends during the entire energy deposition period;

(4) The energy deposition process must be essentially isothermal; i.e., waste heat must be removed at a rate such that the maximum gas temperature does not build up beyond approximately 200° C.; and (5) Since self-sustained discharges cannot provide the aforementioned conditions, an external means of ionization must be used. The chosen method must not contribute substantially to the net thermal energy input, nor modify the electron energy distribution substantially over the drift condition calculated for E/N≈10 Td. Condition (5), as well as the occurrence attachment instabilities, rule out the use of electron beam ionization, which otherwise would seem to pose a self-evident solution.

The theoretical $O_2{}^1\Delta$ yield verses the applied electric field/density, E/N in Townsends (Td), is shown in FIG. 1. Here, the chemical branching efficiency ratios for all relevant reactions have been calculated for the electron energy distribution function corresponding to each E/N value. The graph presented in FIG. 1 illustrates that, for E/N falling between 7 and 10 Td, 50% of the applied electrical pump energy is directly stored in the $O_2^1\Delta$ it produces. The graph also shows that at the electric field necessary to sustain a normal glow discharge (i.e., E/N=40 Td), the amount of $O_2^1\Delta$ created is insufficient to sustain laser action.

In a preferred embodiment, the present invention's method of meeting the aforementioned criteria uses: ultra-high E/N (initially greater than approximately 180 Townsends) and ultrashort ($\tau$ is approximately 5–15 nanoseconds) pulses at a rep rate sufficient to maintain an average electron number density of approximately $10^{13}$ to approximately $10^{14}$ electrons/cm$^3$ during the pump period (typically approximately 20 KHz to approximately 40 KHz), while maintaining a constant DC pump field (or magnetically induced square wave potential) at a potential required to produce an E/N value of approximately 10 Td. In most systems of the present invention, ultrashort pulses of less than approximately 75 nanoseconds are desired while preferably pulses are less than approximately 25 nanoseconds and most preferably, pulses are less than approximately 15 nanoseconds. Through experimentation and investigation of a large number of generator configurations, preferred configurations comprise an integral electrical excitation generator and a heat exchanger. These configurations allow isothermal heat addition; i.e., rapid removal of waste heat is in equilibrium with internal rate of heat production. It is noted that the applied pump potential (E/N is approximately 10 Td) falls far below the electric field required to maintain ionization; therefore, a continuous sequence of ultra high voltage (E/N initially greater than or equal to approximately 180 Td), high repetition rate (e.g., 20,000 to 40,000 pps or more) pulses are applied to renew the ionization lost while the field is being sustained at only 10 Td (under fully developed equilibrium conditions, for example). Note that the residual ionization can reduce the E/N level needed to renew ionization from levels of approximately 180 Td to levels less than approximately 180 Td, in some instances, for example, down to levels of approximately 100 Td or less. These ionization pulses must be arrested to limit each pulse to less than a few tens of nanoseconds duration. Any ionization pulses of order E/N greater than or equal to approximately 100 Td to approximately 180 Td (depending on the initial ionization number density) lasting longer than approximately 75 nanoseconds would lead to arc breakdown. Furthermore, ionization pulses lasting longer than a few tens of nanoseconds generates $O^1D$ at a concentration which tends toward becoming deleterious. Of course the invention is not limited to the parameters set forth in this particular embodiment, for example, but not limited to, E/N is not limited to values given, the pulse length is not limited to the values given, and the electron number density is not limited to the values given. Furthermore, the invention is not limited to oxygen iodine lasers, because the pulse circuits and generators of the present invention have other uses as well. Depending on the particular use and configuration of any particular embodiment, E/N values of 150 Td are within the scope of the present invention for over-volting, as well as, for example, but not limited to, electron number density values from $10^{12}$ to $10^{15}$.

Figure 2:
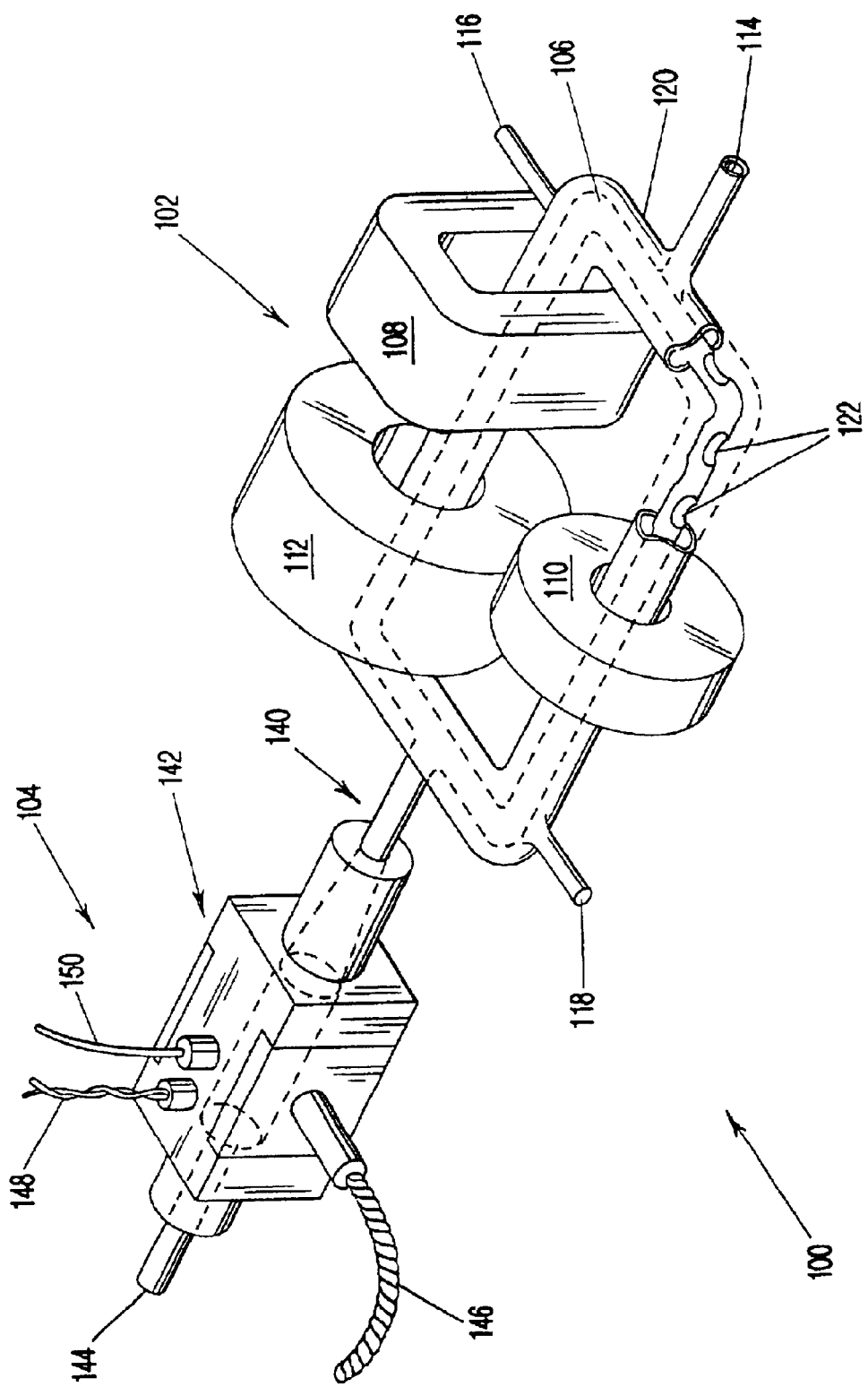
FIG. 2 is a perspective view of a loop configuration of a generator embodiment of the present invention.

An example of a magnetic induction loop generator is illustrated in FIG. 2. As shown in FIG. 2, the generator 100 comprises a loop portion 102 and a measurement/gas exit portion 104. The loop portion 102 comprises a core for providing a poler pulse 108, a current probe 110, a core for main power pulses 112, a gas loop 106 surrounded by a coolant shell 120. As depicted, the cores 108, 112 and the current probe surround the gas loop 106. The gas loop 106 further comprises surface indicia, fins, ribs, etc. 122, for increasing heat transfer to the coolant. The coolant shell comprises a coolant inlet 116 and a coolant outlet 118.

While not an essential part of the apparatus, the measurement/gas exit portion 104 comprises a connection 140 to the gas loop 106. The measurement/gas exit portion 104 also comprises a block for sensors and measurements 142, a gas exit 144, a fiber optic observation and/or communciation connection 146, electrical leads for a thermocouple or other suitable temperature measurement device 148, and a pressure sensor device and/or port for measurement of pressure 150. The block 142 optionally comprises windows and a sensor volume, such a block is known to one of ordinary skill in the art. The gas exit 144 optionally comprises a throttling valve or similar device for controlling gas flow.

In an embodiment of this inventive generator system, a sequence of ionization pulses are magnetically induced into the loop 106 by means of a METGLAS® (Allied Signal Inc., Morristown, N.J.) (or ferrite core) transformer 112 or transformers. Another METGLAS® transformer 108 is used to induce a sub-breakdown potential, square wave into the loop 106. Of course, a "perfect" square wave having instantaneous rise and fall is not achievable in practice; therefore, it is understood that square waves referred to herein have a rise time and a fall time. In this particular embodiment of the present invention, each half cycle of the square wave is of sufficient duration as to drive a transformer's magnetic core to near saturation or to saturation. Likewise, the second half-cycle, which is, for example, of equal magnitude and opposite polarity to the prior half cycle, drives the core to near saturation or to saturation in an opposite manner. The cycling square wave acts to induce a substantially constant electric pump field (e.g., but not limited to, approximately 10 Td) for application to the loop to maintain electrons at their optimal temperature distribution for exciting $O_2$ into the desired $O_2^1\Delta$ state. The fact that the field reverses periodically whenever the core 112 reaches near saturation or saturation does not affect the process because of the relatively short cycling time as evidenced by the duration of the aforementioned ultrashort pulses.

In an embodiment of this particular example of a magnetic induction loop generator, as illustrated in FIG. 2, the plasma path length through loop 106 comprises a length of approximately 60 cm, a cross-sectional area of approximately 0.7 cm$^2$ and a volume of approximately 40 cm$^3$. In this embodiment, the gas flow path through the loop 106 comprises a length of approximately 30 cm and a cross-section of approximately 1.4 cm$^2$. In this embodiment, the exit volume (loop 106 to sensor/measurement block 142) comprises a length of approximately 14 cm, a cross-sectional area of approximately 0.7 cm$^2$ and a volume of approximately 23.1 cm$^3$.

Figure 3:
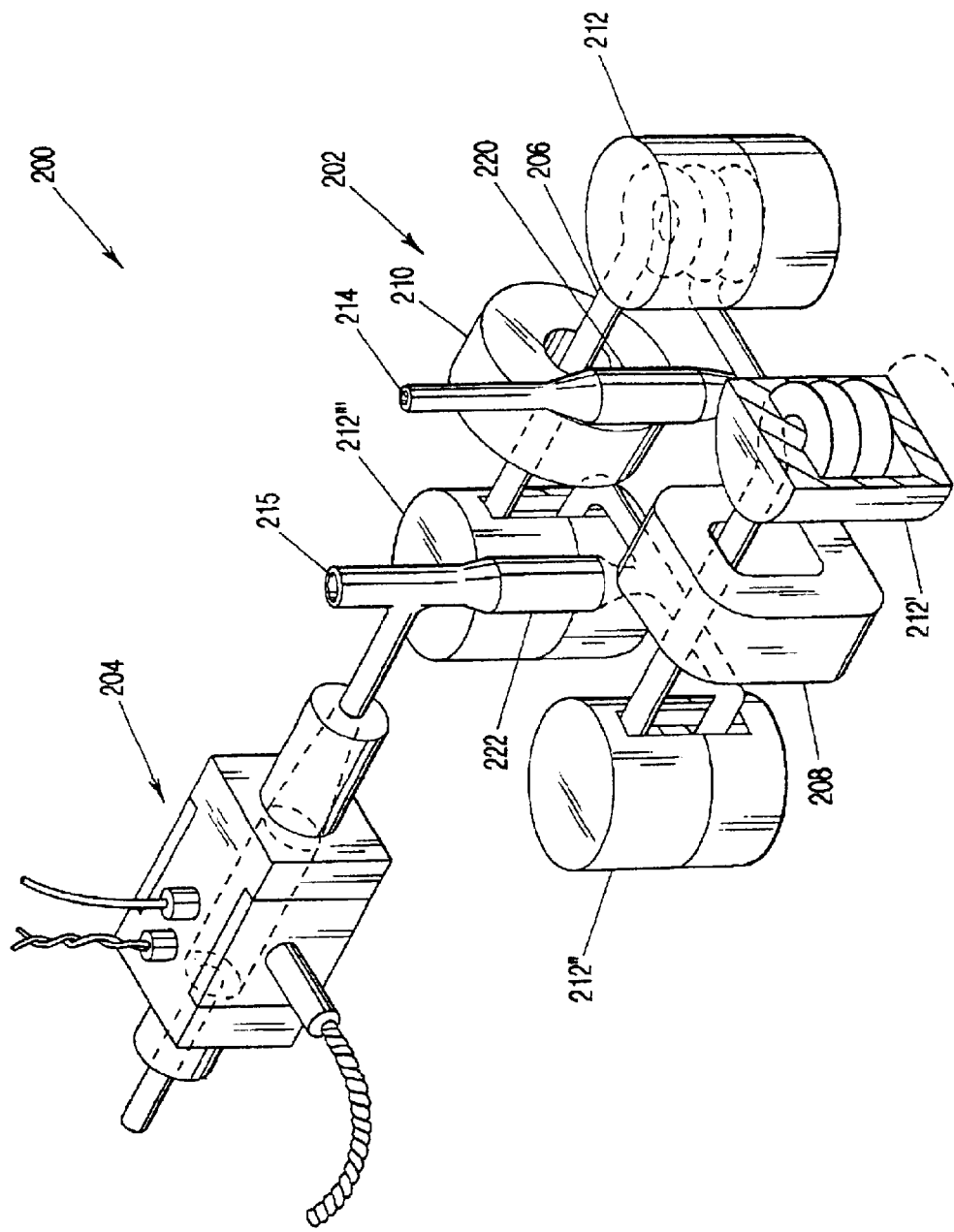
FIG. 3 is a perspective view of a loop and electrode configuration of a generator embodiment of the present invention.

Another embodiment of the present invention, more specifically of a magnetic induction loop generator 200, is shown in FIG. 3. This example comprises a loop portion 202 and a measurement/gas exit portion 204 (used to verify the proof of principle but not essential to this embodiment of the invention). The measurement/gas exit portion 204 comprises the same features as the measurement/gas exit portion 104 of generator 100. Thus, reference to FIG. 2 and its description is suggested for a description of measurement/gas exit portion 204. The loop portion 202 of the embodiment shown in FIG. 3 differs from the loop portion 102, as shown in FIG. 2, in several ways. Loop portion 202 comprises at least one pot core 212 and preferably four pot cores 212, 212', 212", 212'''. The loop portion 204 also comprises a current probe 210 and a core for providing a poker (avalanche) pulse 208.

A loop 206 passes through the at least one pot core 212 wherein the loop 206 makes at least one turn or winding and preferably approximately three windings. Gas enters the loop 206 through at least one inlet 214, which connects to and/or forms an anode 220. Gas exits the loop through at least one gas exit 215, which connects to and/or forms a cathode 222. As shown in FIG. 3, the gas exit 215 comprises a "T" wherein one path connects to the measurement/gas exit portion 204 and the other path exits through a dump valve and/or to a reservoir.

As shown in FIG. 3, this generator system 200 comprises multi-turn transformer windings comprising segments of the loop 206 in series. "Controlled avalanche" pulses are induced in the loop 206 by means of at least one ferrite pot core transformer segment 212. Again, the system is characterized by extremely short ionizing pulses (e.g., approximately tens of nanoseconds), ultrahigh E-field (e.g., approximately greater than or equal to 180 Td), and a delivered repetition rate of approximately tens of kilohertz. A sub-breakdown (10 Td) field (a continuous direct current) is delivered from a cathode 222 on one end of the loop to an anode 220 at the other end. In this embodiment, the direct current (DC) flows in parallel and in the same direction through two current paths (as shown in FIG. 3) of the loop 206 while the ionization pulse current flows continuously around the entire loop 206. Again, the DC's E-field is tuned to the resonant-like magnitude (E/N equals approximately 10 Td) which drives electron excitation of $O_2$ to form $O_2{}^1\Delta$.

Figure 4:
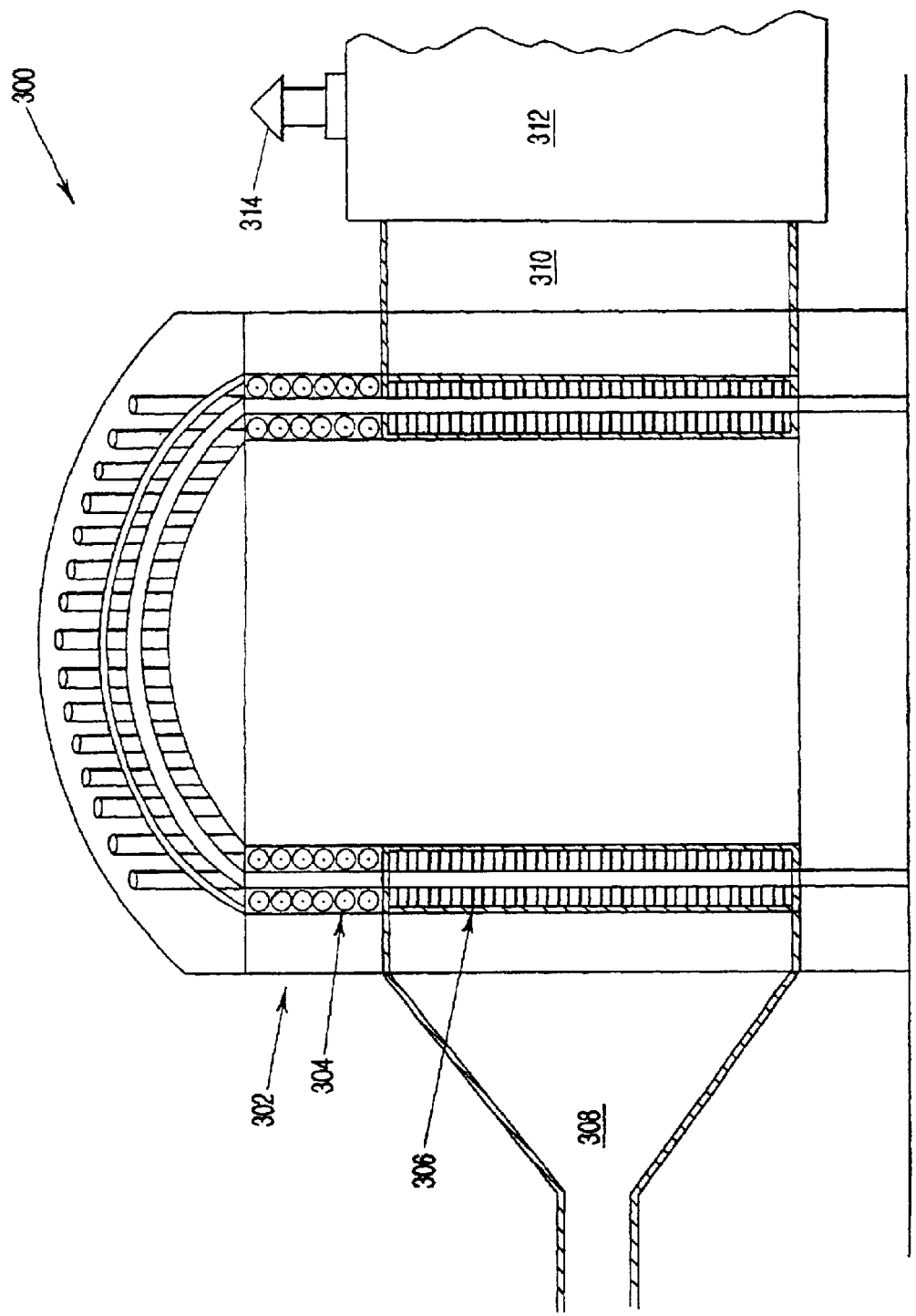
FIG. 4 is a cross-sectional view of a loop and core configuration of a generator embodiment of the present invention.

FIG. 4 illustrates an embodiment of the present invention comprising a cross-sectional view through a cylindrically configured transformer-coupled $O_2{}^1\Delta$ generator 300. This embodiment comprises a single ferrite core 302 to transform both a sequence of approximately greater than or equal to approximately 150 Td ionization pulses, and a sub-breakdown potential, square-wave pump field as described in the embodiment shown in FIG. 3. The ferrite core 302 comprises a coupled loop 304 lined with at least one heat exchanger 306, preferably electrically isolated, to efficiently remove the thermal energy created by the discharge. The generator further comprises a gas inlet 308 and an exit 310 which connects to, for example, a laser channel 312, for production of a laser beam 314. This particular embodiment, while shown with a single core, optionally comprises multiple cores.

Figure 5:
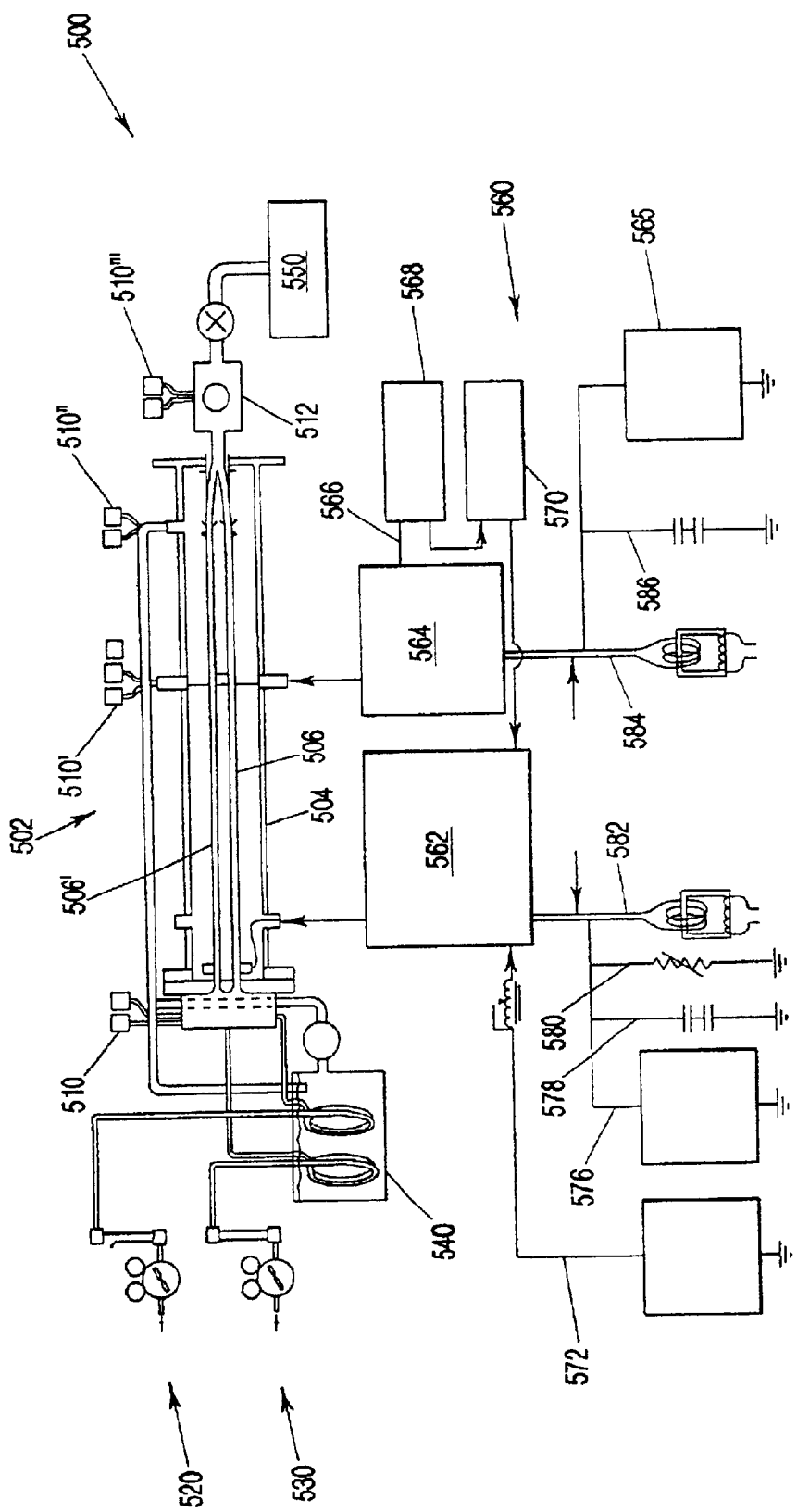
FIG. 5 is a diagrammatic view of a generator embodiment of the present invention.
Figure 6A:
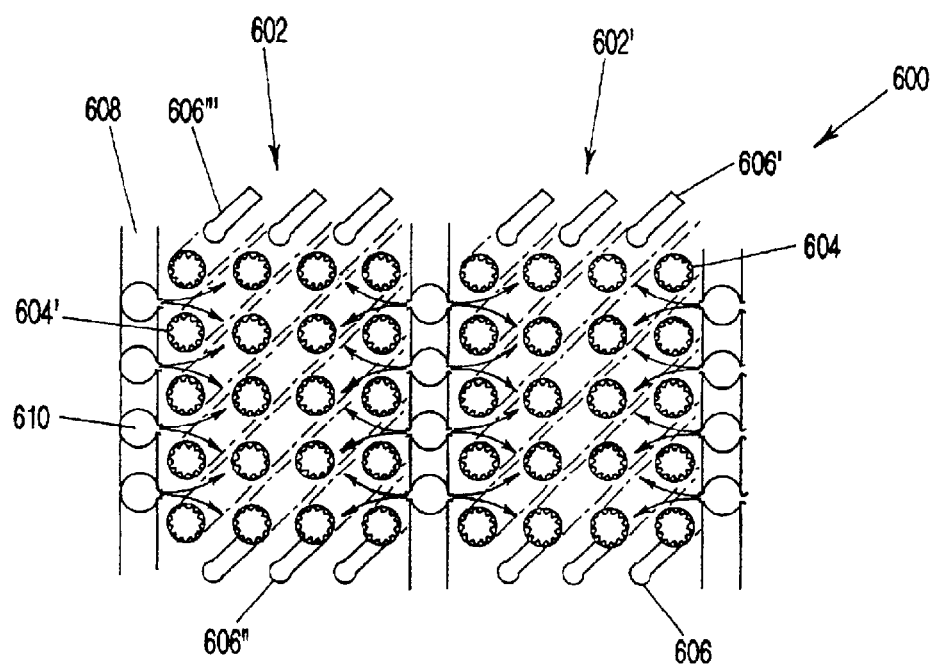
FIG. 6a is a diagrammatic view of tube bank of a generator embodiment of the present invention.
Figure 6B:
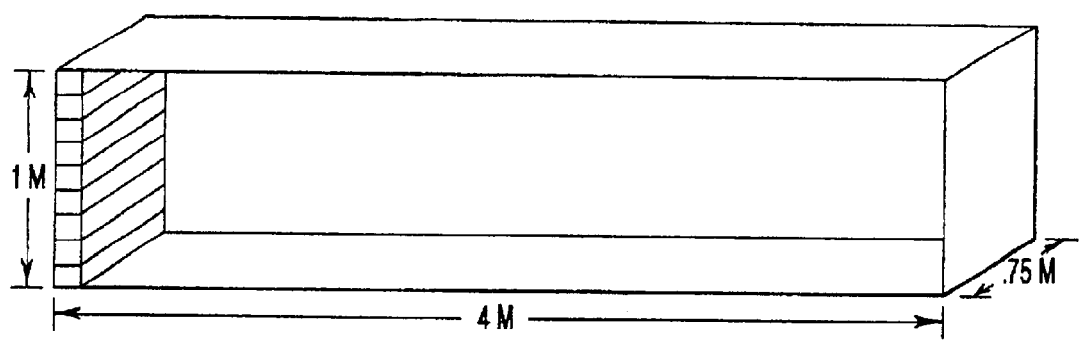

A preferred embodiment of the present invention is shown in FIG. 5. FIG. 5 shows a schematic of a two-tube version of a linear-type, DC-pumped $O_2{}^1\Delta$ generator. Actual operation of this preferred embodiment resulted in $O_2{}^1\Delta$ yields that were more than sufficient for use in an $O_2$—I* laser system. Of course, the number of tubes used in this embodiment is adjustable to generate flow rates needed for a particular laser system. By way of illustration, FIG. 6a shows a "strawman" apparatus for a $O_2{}^1\Delta$ generator configured to power, for example, but not limited to, a 5 MW continuous laser. Further description of the apparatus FIG. 6a is given below. FIG. 6b shows particular dimensions of an embodiment comprising the configuration shown in FIG. 6a.

In reference to FIG. 5, this particular generator embodiment 500 of the present invention comprises a generator with an integral heat exchanger 502. The generator/heat exchanger 502 further comprises, for example, but not limited to, two tubes 506, 506' housed within a shell 504. While two tubes are shown this embodiment is not limited to two tubes and, in general, the embodiment comprises at least one tube. In this particular example, tubes 506, 506' optionally comprise a length of approximately 1 meter, an inner diameter of approximately 1 cm, a material of construction of Be, or other suitable material, and fluting (or other surface indicia, etc.) on the inside to improve heat transfer.

Referring again to FIG. 5, this embodiment further comprises an $O_2$ inlet 520, optionally comprising a flow rate control mechanism, a He inlet 530, optionally comprising a flow rate control mechanism, a gas cooling bath 540, optionally comprising dry ice and/or alcohol(s), and a vacuum pump 550. Of course use of more than one vaccum pump is possible and, for example, but not limited to, such pump(s) is(are) rated individually and/or collectively at a flow rate of approximately 150 CFM. The generator 500 further comprises a variety of measurement/sensor ports and/or devices, known to one of ordinary skill in the art. Such ports and/or devices are shown generally in FIG. 5 (510, 510', 510", 510'") and comprise, for example, but not limited to, ports and/or devices for measurement and/or sensing of temperature, pressure, optical properties, and the like.

FIG. 5 also depicts electronic circuitry 560 for providing pulses. One type of pulse is provided through circuitry 564. In general, circuitry 564 provides a "jump start" pulse. For example, but not limited to, a 50 KV pulse from a circuit comprising at least one vacuum tube. Circuit 564 further comprises a power supply 565, for example, but not limited to, a 50 KV power supply. Circuit 564 optionally comprises a connection 566, for example, but not limited to, a fiber optic connection, to timing electronics 568. Of course, "wireless" modes of connection, relying on electromagnetic transmission are also within the scope of the present invention. In turn, the timing electronics 568 optionally comprises a connection to a velonix driver 570. The velonix driver optionally comprises a connection to another pulse circuit 562. Pulse circuit 562 provides, for example, but not limited to, an approximately −180 KV pulse with a frequency of approximately 10 to approximately 25 KHz that floats approximately 25 KV above ground. Pulse circuit 562 optionally comprises a thyratron-based circuit. Power is provided to pulse circuit 562 through a power supply 572, for example, but not limited to, a −45 KV power supply. Power from the power supply 572 passes through a command charger 574. The pulse circuit 562 further optionally comprises a DC power supply 576, for example, but not limited to, an approximately 12 KV to approximately 18 KV DC power supply. According to electronic circuitry 560, the pulsers 562, 564 further optionally comprise isolation transformers 582, 584. Such transformers 582, 584 optionally comprise, for example, but not limited to, 50 KV low capacitance isolation transformers. As shown in FIG. 5, the power supply 565 is connected to pulser 564 and further connected to ground, through the power supply and/or through additional circuitry 586, such as, but not limited to, capacitive and/or resistive circuitry. The power supply 576 is connected to pulser 562 and further connected to ground, through the power supply and/or through additional circuitry 578, 580, such as, but not limited to, capacitive and/or resistive circuitry.

The embodiment shown in FIG. 5 further optionally comprises plasma diagnostics, such as, but not limited to, avalanche current, avalanche voltage, pump current and/or pump voltage. The embodiment shown in FIG. 5 further optionally comprises gas diagnostics, such as, but not limited to, pressure, mixture/composition, flowrates, and/or temperatures. The embodiment shown in FIG. 5 further optionally comprises optical diagnostics and/or recorders. An optical diagnostics port 512 is shown in FIG. 5.

In an experimental apparatus according to this embodiment, a two tube generator was used wherein the tubes were submerged in a flouroinert dielectric liquid bath which was, in turn, maintained at dry ice temperatures, approximately −78.5° C., by means of circulating pumps. Each tube was injected with metastable helium to pre-ionize the gas volume while a predominantly $O_2$ flowstream (with some helium) flowed through the tubes at approximately Mach 0.3 to approximately Mach 0.5.

Operation of this aforementioned system comprises, for example, but not limited to, application of up to approximately 180,000 volt pulses of approximately 30 nanosecond duration that are generated at the rate of approximately 25,000 pulses per second. Application of these pulses created ionization of the gas contained in the tubes. Between pulses, the ionization number density fell by about 15% (the percentage fall is dependent on pressure); however, each succeeding pulse compensated for this loss in number density. The emergent gas flowed through an optical diagnostic cell and into a 150 CFM vacuum pump. The ionizing pulse train floated on top of a pure DC electric field provided by an approximately 3 KV to approximately 5 KV power supply, which produced about 250 mA of current (average) in each tube. The $O_2{}^1\Delta$ yield was spectroscopically determined and exceeded 16% in pressures of several Torr of pure $O_2$. This particular preferred embodiment is a configuration that provides a basis for additional preferred embodiments of laser systems to be discussed.

Figure 7:
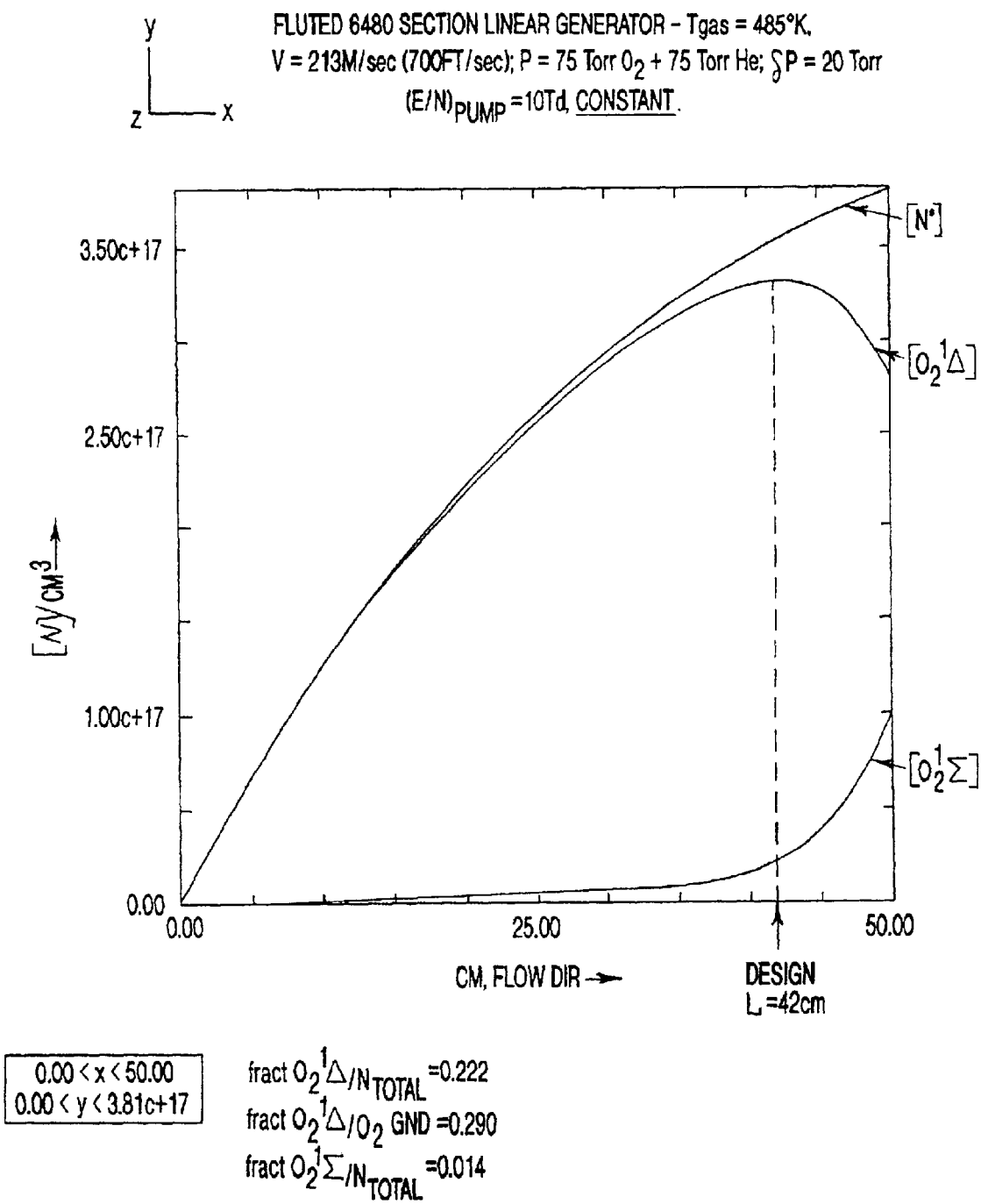
FIG. 7 is a graph of excited oxygen species shown as density versus distance for a particular embodiment of the present invention.

The generation of $O_2{}^1\Delta$, along with other competing processes, has been theoretically calculated along the length of the tubes subject to excitation as described above. The graph of the calculation, FIG. 7, shows that under these conditions the tube will generate its maximum yield of $O_2{}^1\Delta$ if its length is approximately 42 cm. Beyond approximately 42 cm, the "pooling" process causes the creation of $O_2{}^1\Sigma$ to dominate. At 42 cm, the theoretical yield Y (fraction $O_2{}^1\Delta/O_2{}^3\Sigma$) is approximately 29%—a value sufficient to produce superb laser performance. Under differing conditions the optimal length optionally differs; for example, but not limited to, lengths up to and beyond approximately one meter in length are within the scope of the present invention.

Referring to FIG. 6a, a "strawman" apparatus 600 for a $O_2{}^1\Delta$ generator configured to power, for example, but not limited to, a 5 MW continuous laser. As shown, the strawman apparatus 600 further comprises at least one individual bank of plasma tubes 602, 602'. The banks further comprise plasma tubes 604, 604' and current returns 606, 606', 606", 606'''. Surrounding, or spaced between, each bank 602, 602' is a heat exchange fluid supply 608, 608', 608".

In summary, preferred embodiments of the present invention comprises an electric oxygen iodine laser that comprises a generator for generating $O_2{}^1\Delta$ wherein the $O_2{}^1\Delta$ generator comprises:

(1) A means for generating low-level, pre-ionization of at least one chemical species—"pre-ionization means." In an aforementioned example, metastable helium was generated using an electric discharge pre-ionization generator, thereafter, the metastable helium was injected into a flowstream. Other means of achieving pre-ionization include (a) dielectric barrier discharges; (b) photo-ionization; (c) X-ray ionization; (d) electron beam injection; (e) brush-cathode induced "runaway" electrons; (f) microwave; (g) RF induction (capacitively or magnetically induced); and/or (H) a nuclear radiation source;

(2) A means for sustaining a significant level of quasi-continuous ionization, for example, wherein such means comprises generation and application of a rapid sequence of ultrashort, ultrahigh voltage pulses to at least one pre-ionized chemical species—herein referred to as a "pulsing means." Where means for sustaining comprises ultrashort, ultrahigh voltage pulses, pulse magnitude significantly exceeds the arc potential required for creation of an avalanche of ionization to a degree (on the order, for example, but not limited to, of approximately $10^{12}$ to approximately $10^{15}$ electrons/cm$^3$) while pulse duration is sufficiently short as to prevent arc formation and to minimize formation of undesirable excited state oxygen, e.g., the $O^1D$ state. Pulse duration, or pulse length, is preferably less than a few tens of nanoseconds, and in all instances, less than approximately 75 nanoseconds, and most preferably less than approximately 15 nanoseconds. In addition the pulse energy is capable of "over-volting" the plasma in its original pre-ionized state to typically an initial E/N of, for example, but not limited to, approximately 150 Td to approximately 180 Td. Following the initial ionization pulse of E/N equal to, for example, but not limited to, approximately 150 Td to approximately 180 Td, subsequent ionization pulses taper off to a lower E/N value of E/N equal to approximately 100 Td to approximately 120 Td in response to an increasing value of electron number denisty. As a result, the intended average quasi-continuous number density (approximately $10^{12}$ to $10^{15}$ electrons/cm$^3$) is controlled and maintained. The pulser circuit is especially designed to provide the initial 180 Td "jump starter" pulse, then fall off to a suitable, maintained E/N value by means of an interaction between the circuit and the plasma's conductivity which controls the process. Other comparatively short, "over-volted" forms of electrical excitation such as, but not limited to, microwave or RF bursts, may be used as alternatives to or in combination with other pulsing means and/or other sustaining means;

(3) A means of impressing a sub-breakdown voltage of controlled average magnitude or magnitudes. According to the present invention, means of impressing causes current to flow through a region of fluctuating ionization as created by the means for sustaining comprising, for example, the aforementioned pulsing means. Alternatively, a sub-breakdown voltage is magnetically induced as, for example, application of aforementioned square wave energy to maintain an approximately fixed potential through a square wave having alternating polarity. The potential, in either instance, is selected so that E/N falls well below the glow potential and preferably within the range of approximately 7 Td to approximately 10 Td, of course this value is adjustable to account for other system parameters. In preferred embodiments using a controlled "graded" E/N, E/N is continuously varied along the operational path and is a function of $O_2{}^1\Delta$ concentration (or $O_2{}^1\Delta$ pressure). Several preferred embodiments of the present invention use graded E/N technology. Grading of E/N over system operation allows for, in most instances, optimum efficiency. As mentioned previously, and with reference to FIG. 1, choice of E/N depends on levels of $O_2{}^1\Delta$, whether measured in terms of concentration or pressure. In particular, $O_2{}^1\Delta$ levels are monitored (primarily for experimentation) with reference to concentrations and pressures of other chemical species within the system, for example, but not limited to, other oxygen species.

(4) A means of exchanging heat energy is desirable, and in most instances it is required, because the temperature dependence of the pooling rate for $O_2{}^1\Delta + O_2{}^1\Delta \rightarrow O_2\Sigma + O_2{}^3\Sigma$, and the very strong temperature dependence of the equilibrium constant for the excitation reaction $O_2{}^1\Delta + I \rightarrow O_2{}^3\Sigma + I^*$. Thus, it is imperative that the process be kept as cold as possible and occur as quickly as possible. Within generators of the present invention, the aforementioned conditions are met by, for example, starting the process very cold, removing the generated heat immediately and by flowing the gas through the apparatus as quickly as possible. Within the lasing volume, fast flow rate and cold temperature conditions are simultaneously met by expanding the flow to supersonic velocities.

EXAMPLES

Three specific point design examples of lasers intended for three distinct classes of applications are presented below. All of these examples are based on a linear $O_2{}^1\Delta$ generator/integral heat exchanger concept as illustrated in FIG. 5.

Case I System: Open Cycle, 20 KW Class, Continuous Laser.

Figure 8A:
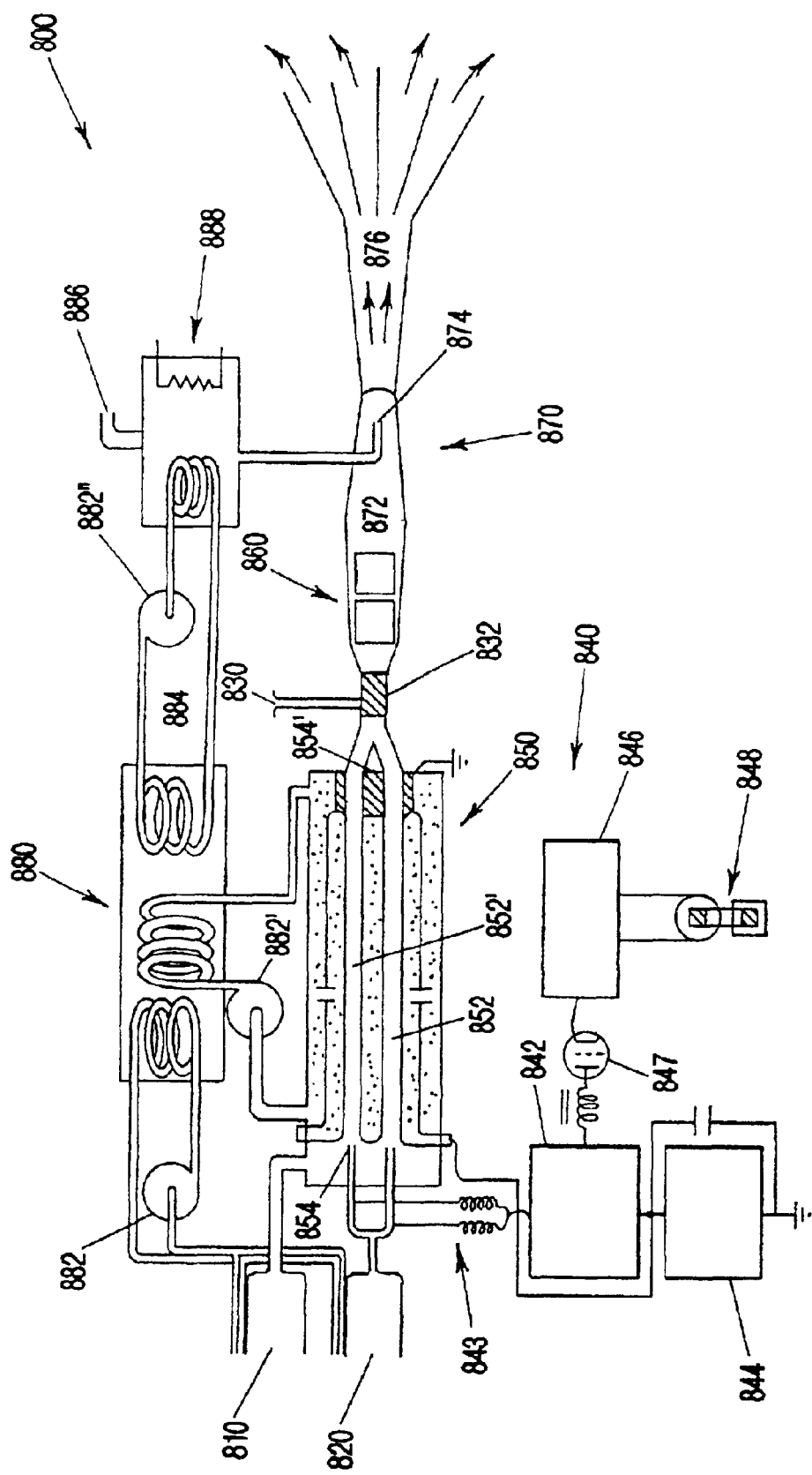
FIG. 8a is a diagrammatic side view of a laser of an embodiment of the present invention.
Figure 8B:
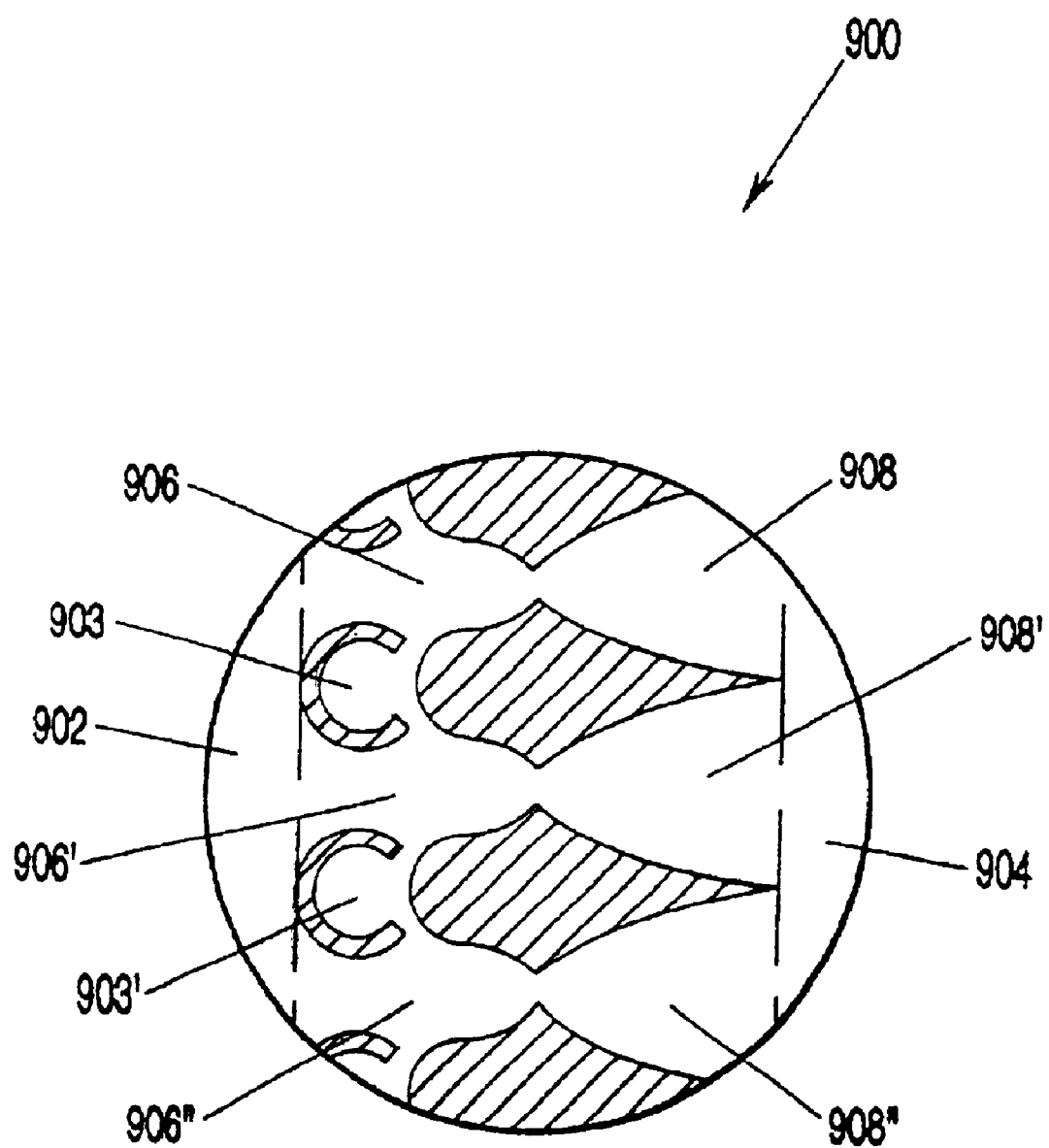
FIG. 8b is a diagrammatic view of an injector block of an embodiment of the present invention.

This configuration is intended to provide a very compact, light-weight laser for applications where only short-run times are needed but compact packaging concerns are at a premium. Typical applications for such laser systems include fracturing of rocks in mining or well-drilling operations, where field portability is advantageous. In FIG. 8, both side view (FIG. 8a) and top view (FIG. 8b) of a Case I System of the present invention are shown. The top view shows only a laser channel, which is common to other configurations that follow.

A laser 800 according to a preferred embodiment of the present invention is shown in FIG. 8a. This open cycle electric oxygen iodine laser 800 comprises an oxygen supply 810, a helium supply 820, an iodine supply 830, a power supply system 840, an $O_2{}^1\Delta$ electric generator/heat sink assembly 850, a resonator cavity 860, a supersonic/subsonic diffuser discharge assembly 870 and a heat exchange system 880.

Figure 8C:
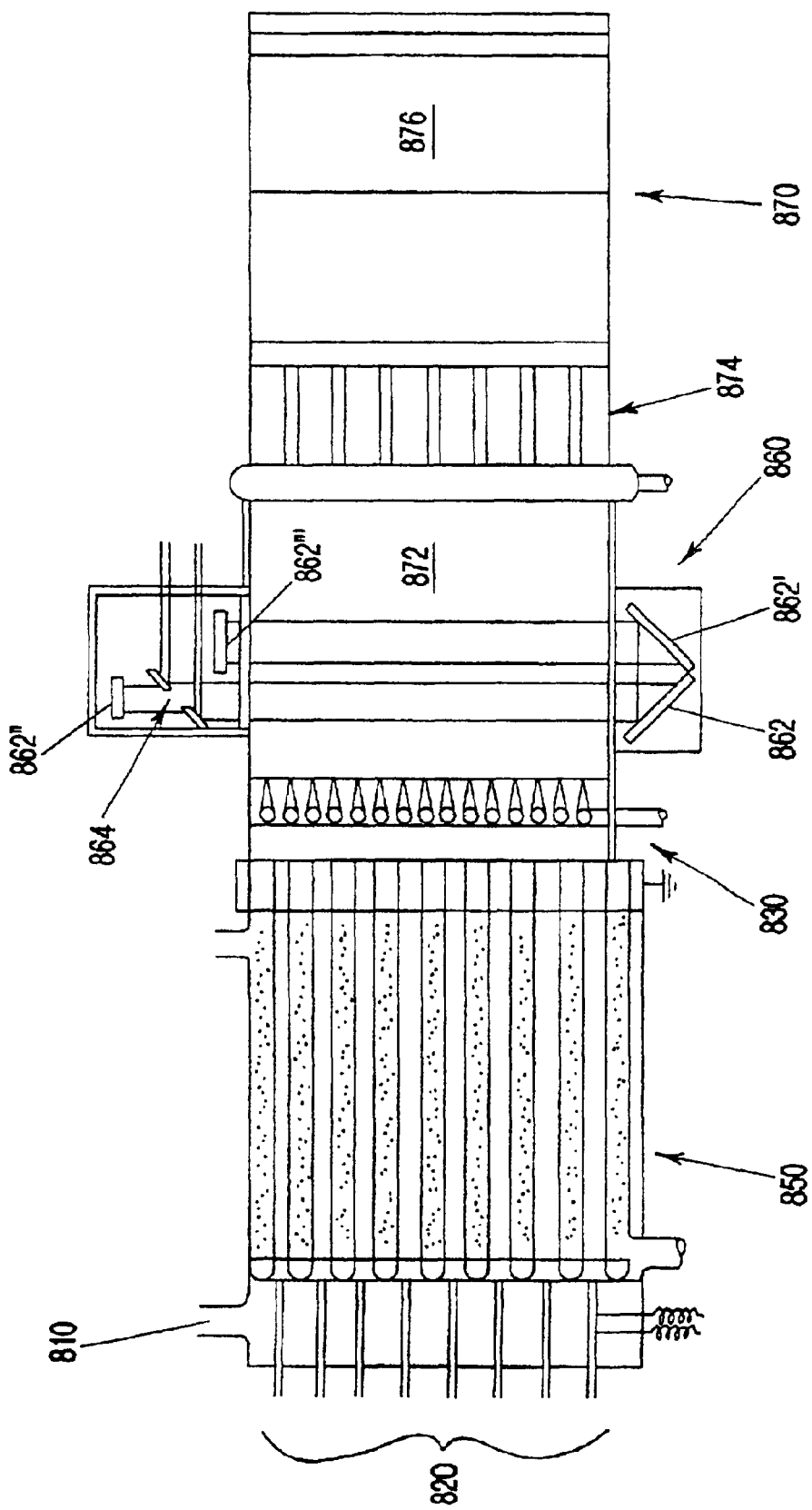

As shown in FIG. 8, the heat exchange system 880 of this embodiment connects to the oxygen and helium supplies 810, 820, the $O_2{}^1\Delta$ electric generator/heat sink assembly 850, and the supersonic/subsonic diffuser discharge assembly 870. The heat exchange system 880 further comprises at least one pump for pumping fluid and/or gas 882, 882', 882". The at least one pump provides for circulation of fluid/gas from the $O_2{}^1\Delta$ electric generator/heat sink assembly 850 to the heat exchange system 880. In this particular embodiment, the heat exchange system 880 further comprises, as shown, a heat exchange loop 884 for exchanging heat with an ejector gas from an ejector gas supply 886. This subassembly optionally comprises, in lieu of or in addition to the heat exchange loop 884, a thermal energy input 888 to achieve a suitable ejector gas temperature. An ejector gas manifold from the ejector gas supply 886 enters the supersonic/subsonic diffuser at a point upstream 874 from the subsonic portion 876 of the diffuser; however, the ejector gas does not enter the flow stream until approximately the shock region, which is substantially between the supersonic and subsonic regions (as shown more clearly in FIG. 8c below).

The $O_2{}^1\Delta$ electric generator/heat sink assembly 850 of this particular embodiment comprises at least two tubes 852, 852'. Located at opposite ends of the tubes 852, 852' are fore and aft electrodes 854, 854'. This particular embodiment is optionally configured with a fore cathode or anode and an aft anode or cathode, respectively, for purposes of discharging a direct or alternating current at sub-breakdown field strength into the plasma. In either instance, metastable helium is formed at or near the fore electrode, for which the fore electrode comprises a cathode, regardless of whether it comprises a cathode or anode for purposes of providing seed volume ionization from which to initiate an avalanche. Of course for low pressure operation and other types of operation, the invention does not have to rely on this particular apparatus or method of forming metastable helium. Other methods and apparatus for providing seed volume ionization are within the scope of the present invention and known to those of ordinary skill in the art.

The power supply system 840 comprises a floating, high repetition, nanosecond, high voltage pulser 842, a DC power supply 844, power conditioning electronics 846, a high voltage isolated power transformer 848, a command charger 847 and appropriate leads 843 to the $O_2{}^1\Delta$ electric generator/heat sink assembly 850. The command charger 847 is positioned between the power conditioning electronics 846 and the floating, high repetition, nanosecond, high voltage pulser 842. The high voltage isolated power transformer 848 is connected to the power conditioning electronics 846.

The laser beam is produced at the resonator 860, which in this particular embodiment comprises a two-pass unstable resonator cavity, shown in an end view in FIG. 8. The resonator 860 is positioned after an iodine injector 832 and before the supersonic diffuser 872. In this particular embodiment, the iodine injector 832 comprises a supersonic nozzle block, which a particular embodiment thereof is described in further detail below.

The iodine injector 832 shown in FIG. 8a comprises a supersonic nozzle block. A close-up of this block 900 is shown in FIG. 8b. This block comprises an inlet side 902 and an outlet side 904. Gases in subsonic flow enter the inlet side 902, mix with iodine, and optionally a combination of helium and iodine, supplied through iodine injection ports 903, 903', in a mixing region 906, 906', 906". This mixture of gases expands in the supersonic expansion region 908, 908', 908" to achieve supersonic flow. In a particular embodiment of the invention, gas leaving the supersonic nozzle block comprises a velocity of approximately Mach 2.5 to approximately Mach 3.0. The gas further optionally comprises a temperature of approximately 112 K or lower. The basic principles of the supersonic nozzle block of FIG. 8b are known to those in the art of COIL lasers.

FIG. 8c shows a top view of the inventive apparatus of FIG. 8a. In this view of this particular laser embodiment 800, the oxygen supply 810, the helium supply 820, the iodine supply 830, the $O_2{}^1\Delta$ electric generator/heat sink assembly 850, the resonator cavity 860, and the supersonic/subsonic diffuser discharge assembly 870 are shown. The resonator cavity 860 further comprises a plurality of resonator mirrors 862, 862', 862", 862'". The resonator cavity additionally comprises at least one laser beam output coupler 864. This mirror optionally comprises an annulus for output of an annular laser beam, if used in conjunction with an unstable resonator, or a partially transmitting and partially reflecting optical element, if used in conjunction with a stable resonator.

In a Case I System, all laser gases pass through the channel only once (open cycle) and must be stored in a quantity sufficient to cover a particular application or mission. Storage of gases in cryogenic form provides a means of cooling, or exchanging heat energy, with the system and, in turn, heat energy absorbed into cryogens causes a change to a gaseous state and vaporization.

In a Case I System, a $O_2{}^1\Delta$ generator of the present invention consisting of, for example, but not limited to, approximately 80 tubes, each approximately 42 cm long (longer tubes, for example, but not limited to approximately one meter in length or longer are also within the scope of the present invention), produces an oxygen flow rate that is sufficient to power a 20 KW laser. The generator, in turn, comprises a pre-ionization means and a means for sustaining quasi-continuous ionization by the same kind of pulsers and power supplies described for the 2 tube experimental generator of FIG. 5. The physical operating conditions for this laser are summarized below.

Physical Operating Conditions for 20 KW Electric Oxygen Iodine Laser

Minimum Yield (Y)=0.16, $T_{cav}$=112 K Case
Resonator:
$\alpha_o$=0.0074, Mag 1.4 Resonator, L≈3 meters total path
Scaled from ROTOCOIL according to:

$$\alpha_o \approx \left(1 - \left(\frac{1}{2K_{eq}+1}\right)\left(\frac{1}{Y}\right)\right)$$

Lumped Mirror Losses: $r_1, r_2=0.998$, $|\gamma|_{max}^2 = 1-\delta = 0.75$ $\eta_{ext} =$ $$\eta_o \eta_s = \frac{\ln(|\gamma|^2 r_1 r_2)}{2\langle\alpha_o L\rangle} + 1 + (2 - r_1 - r_2) \times \left[\frac{1}{\langle 2\alpha_o L\rangle} + \frac{1}{\ln(|\gamma|^2 r_1 r_2)}\right] = 0.92$$

Kinetics:

$$\eta_{kin} = \frac{Y - \left(\frac{1}{2K_{eq}+1}\right)}{Y} = 0.888$$

where:

$$K_{eq} = 0.75 \times e^{402/112} = 27.16$$

$$Y = \frac{|O_2^1 \Delta|}{|O_2^1 \Delta| + |O_2^3 \Sigma|} = 0.16$$

Power Output=20 KW
Power Available=$P_{out}/(\eta_o \eta_s \eta_{pack} \times \eta_{kin})$=20 KW/(0.92×0.9×0.888)=27.2 KW Stored Power $$P_{stored} = \dot{M}_{(moles/sec)} \times \left(Y - \left(\frac{1}{2\ K_{eq}+1}\right)\right) \times 91.3 \text{ KJ/mole}$$

$$\dot{M} = \frac{27.2 \ KW_{stored}}{(0.16 - 0.018) \times 91.3 \ \text{KJ/mole}} \cong 2.1 \ \text{moles/sec}$$

Summary of 20 KW Laser
Input Parameters:
M=2.5 Flow
$T_{cav}$=112 K
$K_{eq}$=27.16
M≈2.1 mole/s $O_2$(+2.1 mole/s He+0.02–0.04 mole/s I)
$P_{gen}$≈25 Torr $O_2$+25 Torr He
$P_{cav}$≈5 Torr, Total
Y=0.16, fraction $O_2^1\Sigma$=0.018
Output Parameters:
Power Out=20 KW
$P_{stored}$=27.2 KW
$\eta_{next}$ ≈0.92
$\eta_{pack}$≈0.9 (assumed)
$\eta_{kin}$≈0.888
$\alpha_o$≈0.0072
Mag 1.4 Res approximately 2 times diffusion limit Power Requirements

| I. Power Required to Drive Laser | |
|---|---|
| Plasma Ionization | 28 KW |
| Electric Pump Excitation | 140 KW |
| Gas Re-Circulation | 20 KW |
| Auxiliary Systems | 40 KW |
| Power Conditioning Losses (includes electrode losses) | 28 KW |
| Laser Power Requirements, subtotal* | 254 KW |
| Laser Wall Plug Efficiency (less cooling subsystems) | 8% |
| II. Power Required to Reject Heat For Closed Cycle Operation (if electrically refrigerated) | |
| Power Added to Reject 40 KW at +20° C. | 40 KW |
| Power Added to Reject 114 KW at −20° C. | 130 KW |
| Thermal Management Subtotal | 170 KW |
| Total System wall Plug efficiency (electrically refrigerated) | 4.7% |

*Assumes worst case performance estimates, and that all heat is exhausted into ambient air (no "cooling tower"). Specifically assumes:
Fraction $O_2'\Delta$ generated       17.8%
Fraction $O_2'\Delta$ lost to cooling      1.8%
Fraction $O_2'\Delta$ reaching output of generator     16%
Efficiency of $O_2'\Delta$ generation at 10.5% concentration     22%
Total kinetic energy in flow stream     30 KW
Pump power needed to generate 30 KW excited species 140 KW Note that "II. Power Required to Reject Heat for Closed Cycle Operation" is also useful in describing open-cycle operation, wherein dynamic gas expansion from a source to the generator and/or cryogens are optionally used to maintain temperature.

Note that all of the numbers and calculations shown are for illustration of various embodiments of the present invention and do not limit the scope of the invention.

As shown, subsequent to the oxygen plus helium (or, e.g., argon) buffer gas passing through the $O_2^1\Delta$'s generator structure, iodine vapor carried by a buffer gas (e.g., helium) is injected into the flow channel. Immediately past the mixing region, the flowstream is expanded to a flow velocity of Mach 2.5 where cooling occurs, to approximately 112 K at the resonator. The cavity is 1 m wide, utilizes a 2 pass transverse unstable resonator, which produces a 2 times diffraction-limited beam at approximately 20 KW. About 200 KW of electrical power is supplied to the system, and approximately 2.1 moles $O_2$ plus approximately 2.1 moles He are stored for each second of operation.

Although design calculations were based on 20 KW operation, the technology of a Case I System is scalable up or down as needed. In fact, the results presented above were based on $O_2^1\Delta$ yield measurements that are approximately a factor of two less than a realistically achievable, optimal yield. Therefore, a most optimistic scenario achieves 40 KW average power output from the same Case I System without need for further power input.

Case II System: 20 KW Average Power-Class, Closed-Cycle, Continuously Operational Laser.

This system employs the same basic cavity and operational specifications as a Case I System, except that it operates (nearly) closed cycle, so that laser gas make-up rates are relatively inconsequential. This responds to the requirements for a typical heavy-metal working industrial laser and results in a package which very closely resembles a 20 KW, $CO_2$ laser in terms of efficiency gas make-up and cost per watt; however, a Case II System of the present invention makes much narrower cuts, can cut up to ten times deeper, and nearly ten times faster than its $CO_2$ laser counterpart. FIG. 9 illustrates an embodiment of a Case II System showing how the gas flow loop is nearly closed.

Case II laser systems are truck-mountable and field operational, thereby enabling the disassembly of 12 inch-thick steel nuclear reactor vessels and centrifuges for which the U.S. Department of Energy has a most pressing need. Ships, tanks, and many other heavy manufacture operations are foreseen target users of Case II System embodiments of the present invention.

Referring to FIG. 9, a closed-cycle embodiment of a laser system 920 of the present invention is shown. This laser system 920 comprises a generator/heat exchanger 922; a power supply system 924 that comprises a floating, nanosecond, high voltage pulser and a DC power supply; a gas return flow loop 930 and an iodine vapor-He return loop 950. The gas return flow loop 930 further comprises at least two heat exchangers 932, 932' (optionally comprising a chiller, see element 932'); a roots blower 934; a slow flush vacuum pump 936; and a make-up oxygen supply 938. The iodine vapor-He return loop 950 further comprises a helium supply 952 and a heat exchanger 954 that optionally comprises a heater.

Referring again to FIG. 9, a Roots blower pump 934 is used to recompress gases emerging from the subsonic diffuser 960, after which the heat introduced by the pump is removed by a heat exchanger 932', and the flowstream is reintroduced to the electric $O_2{}^1\Delta$ generator 922. This particular Case II System resembles a $CO_2$ laser system; however, with a unique need for handling recycle of iodine 950. In a preferred embodiment of a Case II System, Iodine vapor (carried by heated helium) must be injected just upstream of the supersonic nozzles 956 and removed from the flowstream before the flow reenters the $O_2{}^1\Delta$ generator 922. Hence, this particular Case II System requires two separate flow loops 930, 950, one for the bulk of the gas and another for a relatively small amount of iodine (amounting to approximately less than 1% of the net flowstream). Where buffer gas is used, the gas comprises oxygen species, buffer (e.g., He and/or Ar) and iodine species.

In the aforementioned Case II System, gaseous iodine is "frozen out" on a cooled structure, i.e., a condenser/heat exchanger, 932' downstream of the subsonic diffuser 960, as illustrated in FIG. 9. Solid state iodine resides in crystalline form solidified on the condenser's 932' extensive surface area. After a period of time, for example, a few hours operation, the condenser's surface becomes saturated. The saturated condenser surface is then moved into a second position 954 where it is heated thereby subliming and liberating the solidified $I_2$ as vapor, which, in turn, re-enters the mixing nozzles. In preferred embodiments of a Case II System, there are at least two identical condensers 932', 954, at least one for condensing $I_2$ vapor from the system 932' and at least one for subliming $I_2$ solid for reentry to the system 954 as vapor. As shown in FIG. 9, interchange of surfaces and/or condenser structures requires a downtime of, for example, a few minutes, every several hours; however, the interchange operation is fully automatable.

Case II Systems, as noted for $CO_2$ laser systems, do not operate as a completely closed-cycle: some exchange of gas is required. For Case II Systems, heated helium gas 952 must be injected to carry the iodine and a correspondingly small amount of laser gas must be pumped out of the system. This process disturbs the helium/oxygen ratio thereby requiring introduction of additional "make-up" oxygen 938 to maintain a proper balance. Hence, the system is not completely closed, but the make-up rates are tolerable and practical for the aforementioned applications.

In addition to powering the Roots blower 934, a formidable amount of energy must be spent to cool the $O_2{}^1\Delta$ generator 922. The power drain attributable to cooling is comparatively negligible because the laser per se is very efficient. For example, refer to the numbers presented in FIG. 7 and above as indicators of the comparative power requirements. Calculations for Case II Systems indicate that an overall efficiency of 5% is achievable—an efficiency comparable to that of a $CO_2$ laser system when one accounts for the costs of gas circulation, laser cooling, chilled water requirements, etc.

Case III: High Repetition, Pulsed, 150 KW Average Power, Approximately 200 Joules/Pulse (200 Megawatts Peak), Closed-Cycle Laser.

This particular embodiment of the present invention is intended to address applications such as, but not limited to: (1) nudging space debris out of orbit so that it burns up in the atmosphere; or nudging comets or asteroids repeatedly to gradually divert their path so that they miss striking the earth. Scaled-up Case III laser systems could also play a role in generating controlled nuclear fusion power or propelling rockets and/or satellites into space.

For purposes of this discussion, the calculated parameters for a Case III System appear below.

150 KW Ave., 200 J/Pulse Closed Cycle Electric Oxygen Iodine Laser

Minimum Yield (Y)=0.16 (assumed), Cavity Mach=2.5, $T_{cav}$=100 K Case

Resonator:

$\alpha_o$=0.002, $I_{sat}$≈1440 W/cm$^2$, L=600 cm, folded, Mag= 1.4 Resonator $\alpha_o$ scaled from ROTOCOIL data according to:

$$\alpha_o \approx \left(1 - \left(\frac{1}{2\ K_{eq}}\right) \times \left(\frac{|O_2^3\Sigma|}{|O_2^1\Delta|}\right)\right)\frac{Y}{Y_{RC}}$$

$I_{sat}$ scaled from ROTOCOIL data, according to $I_s \approx \rho V_{cav}$

Lumped Mirror Losses: $r_1, r_2$=0.998, $|\gamma|_{max}^2$=1−δ≈0.75;

$$\eta_{ext} = \eta_{opt}\eta_{sat} = 1 + \frac{\ln(|\gamma|^2 r_1 r_2)}{2\langle\alpha_o L\rangle} + (2 - r_1 - r_2) \times \left[\frac{1}{\langle 2\alpha_o L\rangle} + \frac{1}{\ln(|\gamma|^2 r_1 r_2)}\right] = 0.87$$

Kinetics:

$$\eta_{kin} = 1 - \left(\frac{1}{\left(\frac{O_2^1\Delta}{O_2\text{total} - O_2^1\Sigma}\right)(2\ K_{eq} + 1)}\right) = 0.90$$

where:

$$K_{eq} = 0.75 e^{\frac{402}{T_x}} = 31, T_c = 108 \text{ K}$$

Continuous Wave Power Available from Flowstream Equals:

$$\dot{M}\left(Y - \left(\frac{O_2\text{total} - O_2^1\Sigma}{O_2 tot}\right) \times \left(\frac{1}{2\ K_{eq} + 1}\right)\right) \times 91.7 = 430 \text{ KW}$$

Sanity Check: $\iiint \alpha_o I_{sat} dV$=696 KW (deviation probably due to scaling of $I_{sat}$).

Energy per pulse out=(334 J/pulse)×($\eta_{opt}\eta_{sat}$)×$\eta_{kin}$×$\eta_{kin}$=
334×(0.87)×0.9×0.9=235 J/pulse
Number Cavity Exchange Rate=1290
Maximum Available Power Out=300 KW
Practical Available Power:
  for 2 exchanges per pulse–650 pps=153 KW
  for 3 exchanges per pulse–430 pps=100 KW
Power Requirements: (33% Duty Cycle)

| | |
|---|---|
| Electrical Efficiency of Generator | 20% |
| Pooling Loss, Efficiency | 90% |
| Threshold Efficiency | 90% |
| Energy in Flow (100% Duty) | 430 KW |
| Pump Power | 700 KW |
| Continuous Avalanche Pre-Ionization | 100 KW |
| Cathode/Anode Loss | 15 KW |
| Auxiliary Systems | 33 KW |
| Prime Mover | 380 KW |
| Refrigeration | 700 KW |
| Power Conditioning | 200 KW |
| Total | 2128 KW |

Prime Mover/Gas Requirements:
  approximately 400,000 CFM
  10 Torr Inlet
  $\delta P$=10 Torr
  $O_2$ Flow: 32 moles/s
  He Flow: 32 moles/s
  Make up:
Plug Efficiency at 3 Exchange/Pulse: 100/2128=4.7%

In particular, the feasibility of extracting giant pulses at a sufficient rep rate to enable the aforementioned types of applications is demonstrated.

A preferred embodiment of a Case III System comprises a closed-cycle, supersonically flowing, cavity configuration incorporating transverse optical extraction from an "unstable resonator." This embodiment comprises continuous pumping from a linear integral heat exchanger $O_2{}^1\Delta$ generator, followed by iodine vapor (plus, e.g., buffer) injection—then supersonic expansion. Lasing is retarded while excited gas fills the cavity by means of applying a "permanent" magnetic field that causes Zeeman-splitting of laser transitions states. Once the cavity is filled and acoustical disturbances have settled out, at least one Helmholz coil is electrically pulsed to nullify the permanent magnetic field. Through pulsed nullification of the permanent field and the resulting formation of spontaneous noise, the resonator builds a laser beam within several microseconds. Alternatively, a regenerative amplifier replaces the aforementioned unstable resonator. If pre-seeded from a local oscillator, this alternative system will provide much shorter pulses. Gordon D. Hager at Phillips Laboratory, Kirtland Air Force Base, USA, has reduced the Zeeman splitting method of Q-switching to practice. See, e.g., "Demonstration of a repetitively pulsed magnetically gain-switched chemical oxygen iodine laser," Hager et al., Chem. Phys. Letters., Vol. 204, No. 5, 6, pp. 420–429 (1993). The Zeeman splitting and Q-switching methods and apparatuses of Hager are hereby incorporated by reference.

There are some particular constraints that are driven by the nature of the technology, and the nature of the mission. For example, the laser's cavity must operate at low temperatures, for example, approximately 100 K is a preferred operating temperature, and the cost of conventional refrigeration reduces overall economy. Hence, supersonic flow provides the most practical way of reducing the cavity temperature. Also, hundreds of joules (perhaps kilojoules) must be extracted in each pulse, so the cavity must be large enough to store this energy. A large cavity combined with supersonic flow translates to seemingly high volumetric flow rates (approximately 480,000 CFM for the case presented); however, the pressure is low and therefore the prime-mover power amounts to a much smaller fraction of the total system power than normally encountered with high average power lasers; i.e., only 10% of the total system power is consumed by the prime mover for this "strawman" design if it were to run either CW or at full average power in the pulsed mode. Acoustic settling times may preclude pulsing the flow once per cavity exchange (which would deliver 225 KW average); however, operating at 2 to 3 cavity exchanges per pulse maintains an overall efficiency as high as approximately 5.5% or 4.5%, respectively. Under such circumstances, 230 joule pulses are extractable from the particular cavity analyzed.

Naturally, if the system is to operate continuously at a repetition rate falling between 430 and 660 pps, closed-cycle operation is greatly preferred. And for closed-cycle operation, the most severe energy penalty becomes the matter of removing waste heat. Half of the waste heat (approximately 1 MW) is efficiently carried off by water at room temperature, but an additional approximately 1 MW must be removed at reduced temperatures (−30° F.). Removal of additional waste heat will cost at a minimum 1 MW of electric power to drive, for example, a refrigerative heat exchanger. The remaining thermal task—that of maintaining approximately 110° K within the cavity—is accomplished by supersonic expansion. This thermal energy burden, in addition to the prime-mover power requirements, was included in the derivation of the 5% wall plug efficiency factor. Again, in terms of efficiency, the systems of the present invention rival $CO_2$ laser systems.

Regarding yield, or fraction of $O_2{}^1\Delta$ achievable by the lab generator used in several of the aforementioned examples: Lab measurements indicate a yield of at least approximately 16%—the "strawman" design and calculations are based on this value. Theoretically, more than twice this yield is expected (i.e., approximately 32%), and in fact, high yields were measured on several occasions; however, these higher values were not measured repeatedly with statistical accuracy in mind. Additionally, a known artifact in lower measurements accounts for the possible anomaly of low yield measurements. Therefore, operation of the present invention can conservatively provide yields of at least 16%. Ultimately, higher yields will have a very positive impact in many ways, resulting in: a smaller system size; a higher pulse energy; a shorter cavity resonator for a given power level (owing to higher gain); a higher efficiency; less severe refrigeration/cooling requirements; and potentially subsonic operation for certain missions.

The aforementioned "strawman" designs assume that generator pressure is doubled over the levels demonstrated because it is theoretically and potentially achievable. If not achievable, the pulsed energy storage is halved. On the other hand, if the generator pressure is doubled again (which is quite probable), the pulse energy density doubles.

Finally, the prime-mover power requirement was based on an assumed diffuser recovery factor of 50%. Because there is a small, but yet unquantified, heat release in the supersonic flowstream due to the thermalization of energy stored in $O_2{}^1\Sigma$, the diffuser operation is potentially adversely affected. This may potentially double the prime-mover power requirement resulting in an overall efficiency reduction from approximately 5% to approximately 4%.

Pulser Circuits and Generator Examples

Specifically it is the function of the "controlled avalanche" or pulser circuit to provide and sustain a quasi-continuous level of ionization within the $O_2{}^1\Delta$ generator needed to conduct current during the off periods between the pulses it generates. Regarding ionization, information disclosed in "Continuous Uniform Excitation of Medium Pressure $CO_2$ Laser Plasma by Means of Controlled Avalanche Ionization," Alan Hill, Applied Phys. Letters 22(12), 15 Jun. 1973 is relevant to this point; however, such technology was not previously applied to generation of atomically excited molecular species. This article is incorporated herein by reference. This current, in turn, is driven by the application of a second, DC potential (or equivalent) whose magnitude is of a specified value falling well below that value needed to contribute to the ionization process.

In addition to providing a continuous stream of pulses that sustain ionization, it may also provide an associated string of pulses used to generate pre-ionization or equivalently metastable helium in chambers that lie upstream of the main discharge sections. Such pre-ionization would float on top of the primary "controlled avalanche" pulses, with the controlled avalanche pulses perhaps being delayed slightly with respect to the pre-ionization pulses. (There are a number of methods, previously outlined, for generating the pre-ionization.)

For the case of the preferred embodiment, the controlled avalanche pulser—together with its pre-ionization complement—floats on top of a pure DC potential whose function is to provide the pump current under a temporally steady (although perhaps spatially graded) electric field of the order E/N=10 Td.

Finally it is the function of either this pulser or an associated pulser to provide a single, giant pulse at turn-on in order to produce the ultimate, quasi-steady-state level within a few pulse periods. This one-time intermediate "jump start" process negates the need to supply every pulse at an E/N value of approximately 180 Td. Instead, we provide only the fast pulse at the value of approximately 180 Td, then allow the quasi-continuous pulser circuit to settle down to its ionization maintenance level, which under the conditions of residual ionization (at its start) most probably falls between the value E/N=80 Td and E/N=120 Td (depending on the design level of electron number density, ionization rep rate, pressure, and gas mixture).

The pulser's circuit is designed to interact with the plasma's conductivity, such that its applied potential falls below the value of E/N required to sustain an avalanche as the peak sustained current (correspondingly the electron number density) reaches its design level. Thus, the controlled avalanche pulse potential across the discharge falls well below its impedance-matched potential value in a time much shorter than its impedance-matched, pulse-forming network's time period, as a result of the load impedance having fallen well below the network's impedance at the design point of peak plasma conductivity.

The specific requirements of the controlled avalanche pulser are:

(1) To provide a pulse sequence, wherein each pulse rises to an E/N value of ~180 Td under open circuit conditions (at 50 Torr-Amagat discharge conditions, the corresponding potential may typically reach 180 KW).

(2) Under residual ionization conditions, where the ionization level has decayed to its minimum value following the off period of the pulser and at the onset of the next pulse, the E/N value is clamped to a value of ~80 Td to ~120 Td (according to adjustment of circuit parameters).

(3) Upon completion of the avalanche needed to restore lost ionization to maintain the correct mean level of ionization, the E/N value must, by interaction with the current, have fallen to a level insufficient to contribute to further ionization—typically less than 40 Td.

(4) The rise time of the controlled avalanche pulse is less than 30 nanoseconds, but preferably less than 15 nanoseconds, and most preferably less than 5 nanoseconds.

(5) The impedance-matched pulse width is to be less than 75 nanoseconds, but preferably less than 30 nanoseconds, and most preferably less than 15 nanoseconds, provided that the rise time can be achieved on the order of 5 nanoseconds.

(6) The "jump start" pulse should be capable of sustaining current flow at the voltage corresponding to a plasma E/N of ~150 Td to ~180 Td or more, and at a current level characteristic of the controlled avalanche pulser impedance operating into a matched impedance load.

(7) The rep rate is to be adjustable and must equal or exceed 20,000 pulses per second continuously, and the pulses must be triggerable on demand.

However, in order to excite the highest density flow stream which may reach 150 Torr-Amagat for the case of ionizing very high-powered lasers, the method may require pulsing at higher repetition rates than may be derived by a single controlled avalanche pulser. This is because the ionization loss rate increases with increasing density. In such cases, the rep rate obtainable from a single pulser may be doubled, tripled, or even quadrupled to as much as 100,000 pulses per second, simply by interleaving the pulses from 2, 3, or 4 modules which individually operate at 20,000 to 25,000 pulses per second and function according to the aforementioned specifications. Each of the units must be appropriately synchronized and time-delayed with regard to each other. Then, the 2, 3, or 4 individual pulse trains are simply added.

Example of Pulser Circuit

The design of a controlled avalanche circuit depends on, for example, the power range of a particular laser. The example presented below is suitable for an approximately 20 KW continuous power laser. In general, the design principles of this example are suitable for lasers of average power falling between approximately 5 KW and approximately 150 KW.

Figure 10:
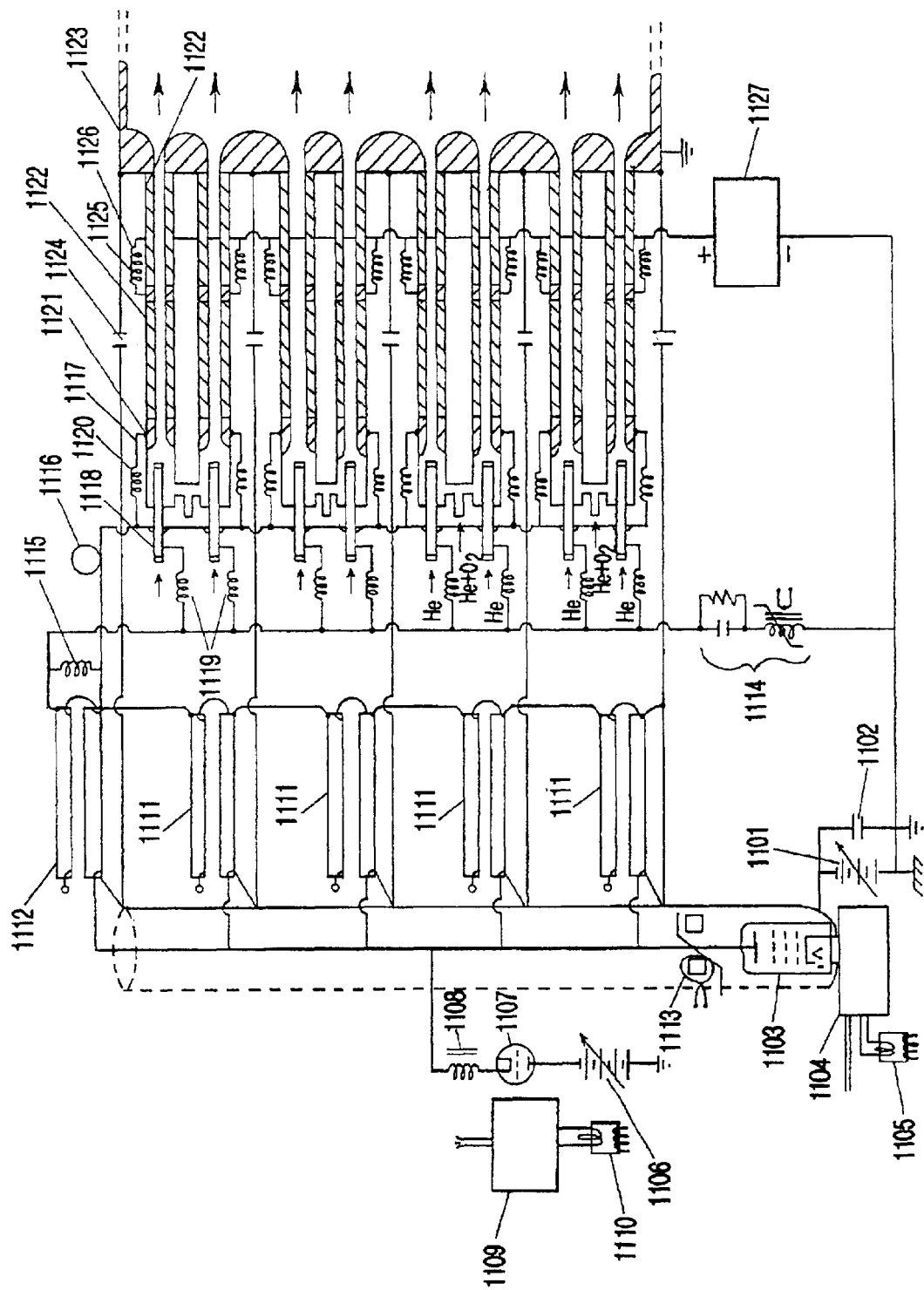
FIG. 10 is a diagrammatic view of a pulser circuit and generator according to an embodiment of the present invention.
Figure 11:
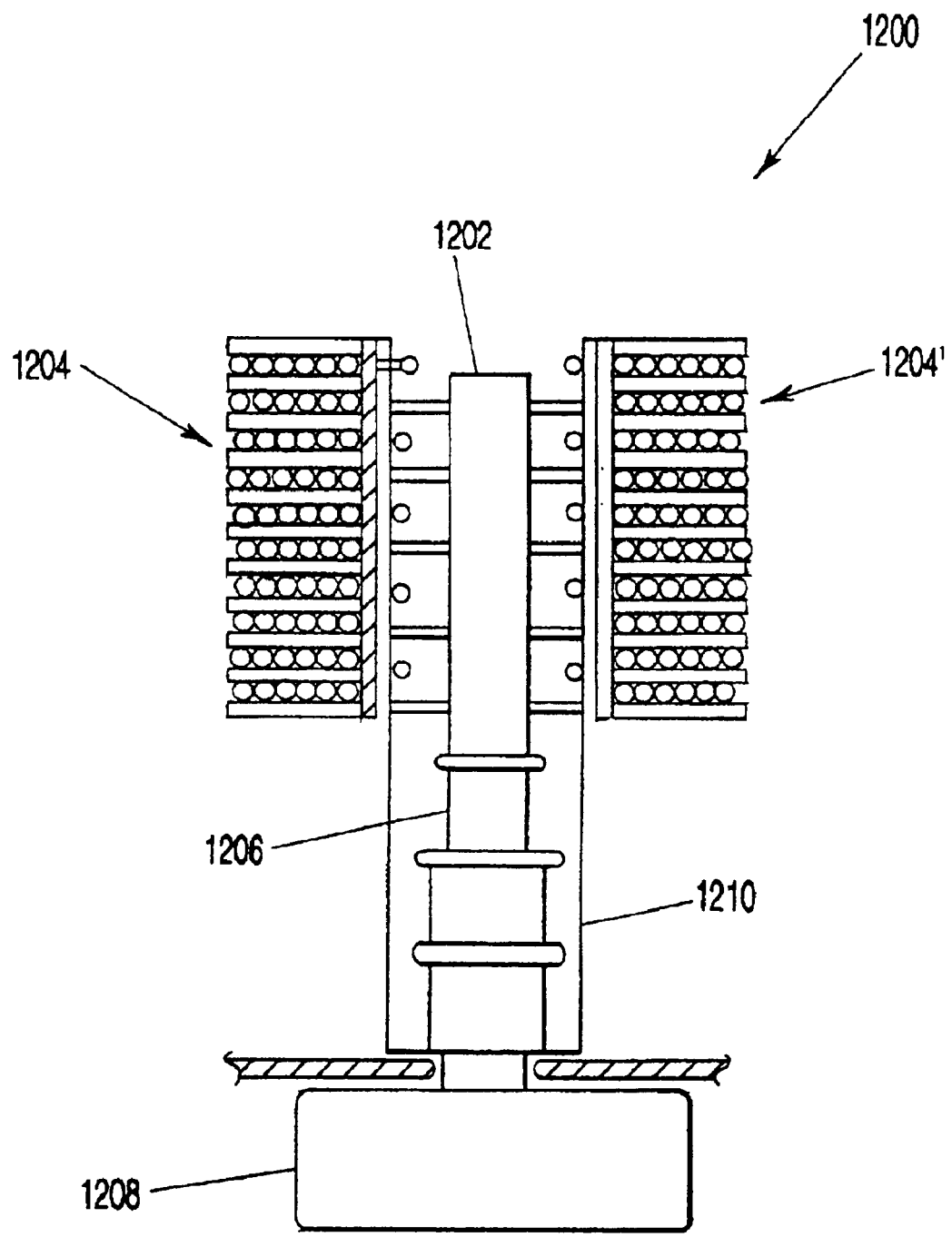
FIG. 11 is a diagrammatic view of a controlled avalanche circuit mechanical assembly according to an embodiment of the present invention.

FIG. 10 illustrates a controlled avalanche, or "pulser," circuit in schematic form. For purpose of illustration, circuit connections are shown as lines or wires. In actual circuits, high speed, impedance-matched mechanical structures such as, but not limited to, coaxial cylinders, strip lines, or all wave-guides are used. An actual packaged circuit as represented by the schematic of FIG. 10, therefore, may physically resemble the circuit shown in FIG. 11, a description of this figure follows below.

Referring to FIG. 10, the pulser circuit and $O_2{}^1\Delta$ plasma generator are illustrated together, since in practice the two units are inseparable and do interact to form a unified circuit. As shown, the pulser circuit sits on top of the DC power supply 1001, which provides the excitation power at a potential which maintains temporally constant, but perhaps spatially graded plasma conditions at or near a value of E/N of approximately 10 Td. A large capacitor 1002 is used to stabilize voltage conditions during a fluctuating current load, and to bypass the avalanche pulses, thus referencing these to ground potential. Typically, the required pump potential will fall between approximately 7 KV and approximately 20 KV, depending on gas density and generator tube length.

The pulse forming network of the circuit consists of four sets of stacked cable Blumlein lines 1011, and are wired so that their potentials add at the output end. A fifth set of cables form a final Blumlein line whose potential is added onto the top of the first four lines 1012. The first four stacked lines provide the primary pulse train which maintains ionization while the fifth line powers the helium meta-stable generators which are located upstream of the $O_2{}^1\Delta$ generator plasma tubes, and serve to provide a volume-distributed source of initial pre-ionization.

For the case of a 20 KW class laser, each of the five lines consist of two approximately 50 ohm coaxial cables, such that their switched impedance on the front end is approximately 5 ohms. If the line has been charged to approximately 20 KV, then approximately 4 KA will flow through the thyratron switch 1003. In turn, the four line segment will have an output impedance of approximately 400 ohms, thus generating an approximately 200 amp pulse at approximately −80 KV if the load were matched to the line at 400 ohms. Note, however, that in the absence of ionization, the output voltage doubles to approximately −160 KV at zero current. The fifth line provides approximately 200 amps at approximately −20 KV lying on top of the approximately −80 KV primary output in addition to the DC pump potential (perhaps −10 KV) in the case where both circuits are loaded into their matched impedances: approximately 400 ohms and approximately 100 ohms, respectively.

When impedance-matched, the pulse output is a square wave whose pulse width matches the two-way propagation time through a single cable. For example, approximately 30 nanosecond wide pulses will be produced when the cable lengths (individually) are cut to be approximately 10.6 feet long, where the cable's index of refraction is assumed to be approximately 1.4—the value which is characteristic of a 50 ohm cable.

In order for the Blumlein lines to function as intended, they must be discharged by the thyratron during a time period which is short compared to the line's two-way pulse propagation length. This is accomplished by using an ultra-fast (pre-ionized), low-inductance thyratron 1103 in combination with a METGLAS® saturable magnetic switch core 1113, and by using an impedance-matched current distribution structure. This switch is for simultaneously grounding the front ends of the Blumlein lines to launch pulses, each time the front ends are grounded one pulse is launched. The METGLAS® core may be reset between pulse firings by means of a floating DC bias current winding on the core.

The basic sequence is to pulse-charge all of the cables from a high voltage power supply 1106 through a triggered command charge circuit consisting of a vacuum tube 1107 and an inductor 1108 which transfers the charge in a time period defined by approximately the resonant half period of the reactor's inductance and the cable's net total capacitance. The tube 1107 also prevents the cable's charge from flowing backward, since the resonant transferred voltage is nearly double that of the charging supply. Note that when the positively charged cable Blumlein lines are switched to ground at the input, a negative high voltage pulse is produced at the output.

Both thyratron and vacuum tubes are controllable by electronic circuits, which are schematically represented by boxes 1104 and 1109, respectively, and which are powerable by floating isolation transformers 1105 and 1110, respectively.

The following describes how the outputs of the cable Blumlein lines are distributed to the array of plasma tubes and their meta-stable helium injection pre-ionizing sections, and also the means by which excess energy is discarded to allow rapid fat time. In general output ends of the Blumlein lines are connected serially. Before continuing this description, however, elaboration of a few details is helpful. The last cable comprising the fifth Blumlein line section is shunted across its output through inductor 1115 in order to remove residual charge prior to pulse charging it (otherwise the line would float). Next, a short length 1116 extension has been added to the output of the ionization pulse line in order to delay the main generator tube's excitation with respect to the pre-ionization.

Finally, the entire string of pulse cables are shunted with a second saturable reactor magnetic switch into a large capacitor, which in turn discharges into a resistor 1114, this is also referred to as a snubber circuit. The magnetic switch holds off conduction for a specified time period, then dumps residual energy (which may be bouncing around due to imperfect impedance matches). This allows the applied potentials to fall in direct response to the plasma, thus circumventing an elevated potential to exist beyond its desired point in time. Again, the saturable magnetic switch must be reset between pulses by means applying a DC bias current to the METGLAS® core.

A number of pulsed ground potential connections must be distributed throughout the generator plasma array to enable low inductance current return. These are each passed through blocking capacitors 1124 in order to ground the pulses while blocking the DC potential, above which the pulse network must float.

A single pulse module comprising ten cables, and one thyratron switch can power as many as, for example, but not limited to, 80 plasma tube generators with their meta-stable pre-ionizer sections. In this particular example, each tube-pre-ionizer assembly consists of a BeO or $Al_2O_3$ tube 1122, an anode/input nozzle 1121, an oxygen and helium reservoir 1117 into which all of the oxygen and most of the helium is introduced, a metal tube 1118 into which some helium (and/or optionally argon is introduced), an anode 1123, and an auxiliary electrode (or electrodes) 1125, which is used to jumpstart the ionization process and possible to help grade the DC pump potential.

The pre-ionization potential is applied between the metal helium injection tube 1118 and the cathode 1121 to provide the pre-ionization pulses. Note that the main discharge cathode serves as an anode for the pre-ionization pulse (the inside of the helium injector tube forms a hot cathode space charge layer which serves to generate meta-stable helium).

The two pulse output busses, residing for example at about −160 KV open circuit and −180 KV open circuit, respectively, are distributed to the tubes through isolating/ballasting inductors 1119 and 1120, one for each of the two circuits and for each tube.

Finally, the intermediate electrodes 1125 are connected through ballasting inductors 1126 (one for each tube) to the jump-start pulser. This pulser provides upon start-up, only one low impedance pulse at a positive polarity which is opposite from the upstream negative polarity. The two potentials are additive (for example, −180 KV+50 K) over a fraction of the tube's total length, thus facilitating rapid initial breakdown.

Referring again to FIG. 11, referenced above, a controlled avalanche circuit mechanical assembly 1200 is shown. A transmission line 1202 is shown centrally surrounded by cable Blumlein lines 1204, 1204'. A thyatron 1206 is shown centrally connected to the transmission line 1202 and in connection with floating thyatron control electronics 1208. A current return 1210 is also shown.

Figure 12:
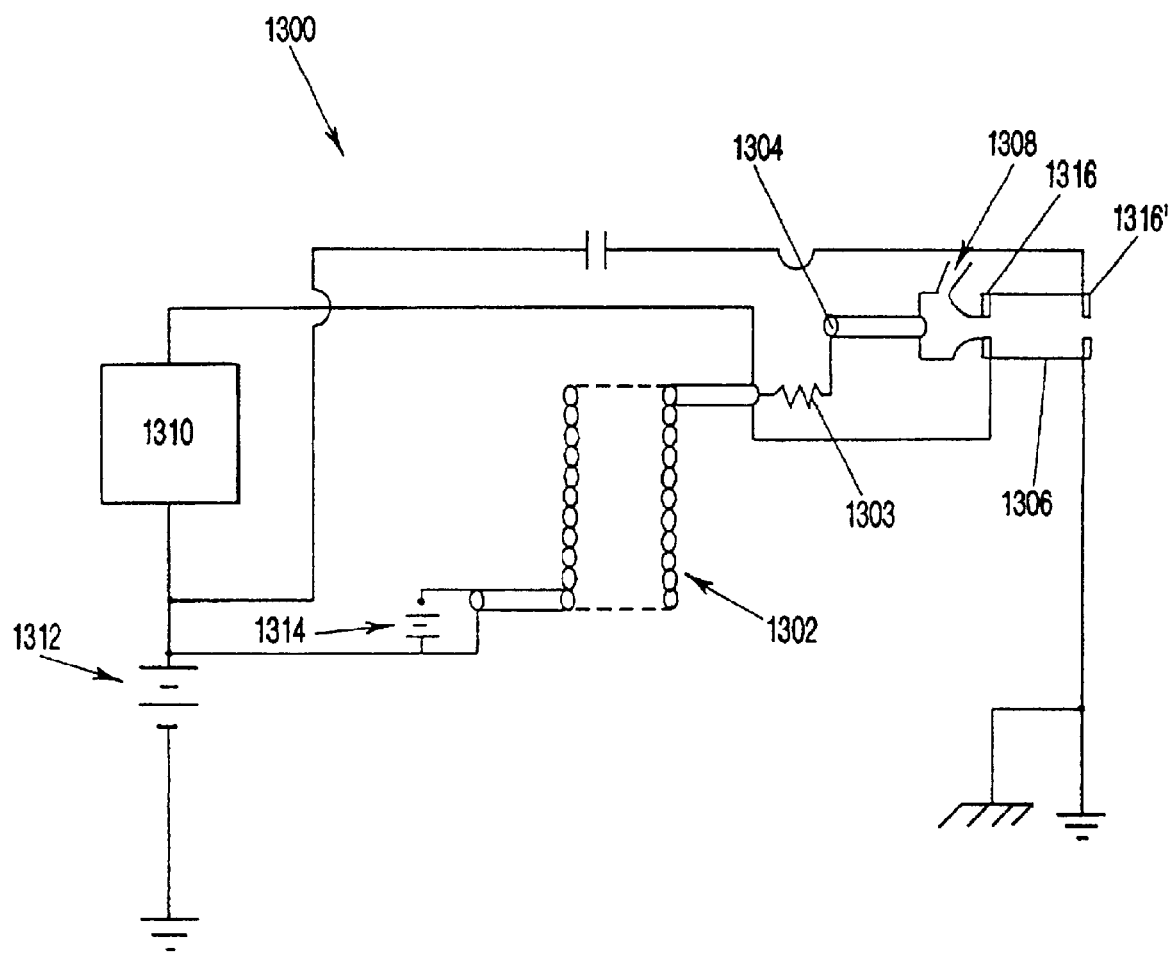
FIG. 12 is a diagrammatic view of a circuit for floating a DC potential on top of a DC jump potential and a pulsed high voltage avalanche ionization potential according to an embodiment of the present invention.

Referring to FIG. 12, an alternative means 1300 of floating a DC potential on top of a DC jump potential and the pulsed high voltage avalanche ionization potential is shown. Compare to the fifth set of cables that form a final Blumlein line whose potential is added onto the top of the first four lines 1012, as shown in FIG. 10. The alternative means 1300 comprises a high voltage blocking inductor 1302, for example, wound from coaxial cable, that is connected through a resistive device 1303 to the helium supply inlet 1304 that feeds a generator tube 1306. An oxygen and/or inert gas supply inlet is also shown 1308. Also shown in FIG. 12 is a high voltage pulser 1310, a DC supply 1312, and a source of DC pre-ionization voltage 1314. Electrodes 1316, 1316' of the generator tube 1306 are shown bounding at the ends, of course, the electrodes may number more than two per tube and be located at a variety of points along the tube.

Longitudinal Beam in Supersonic Throat Arrangement

Figure 13:
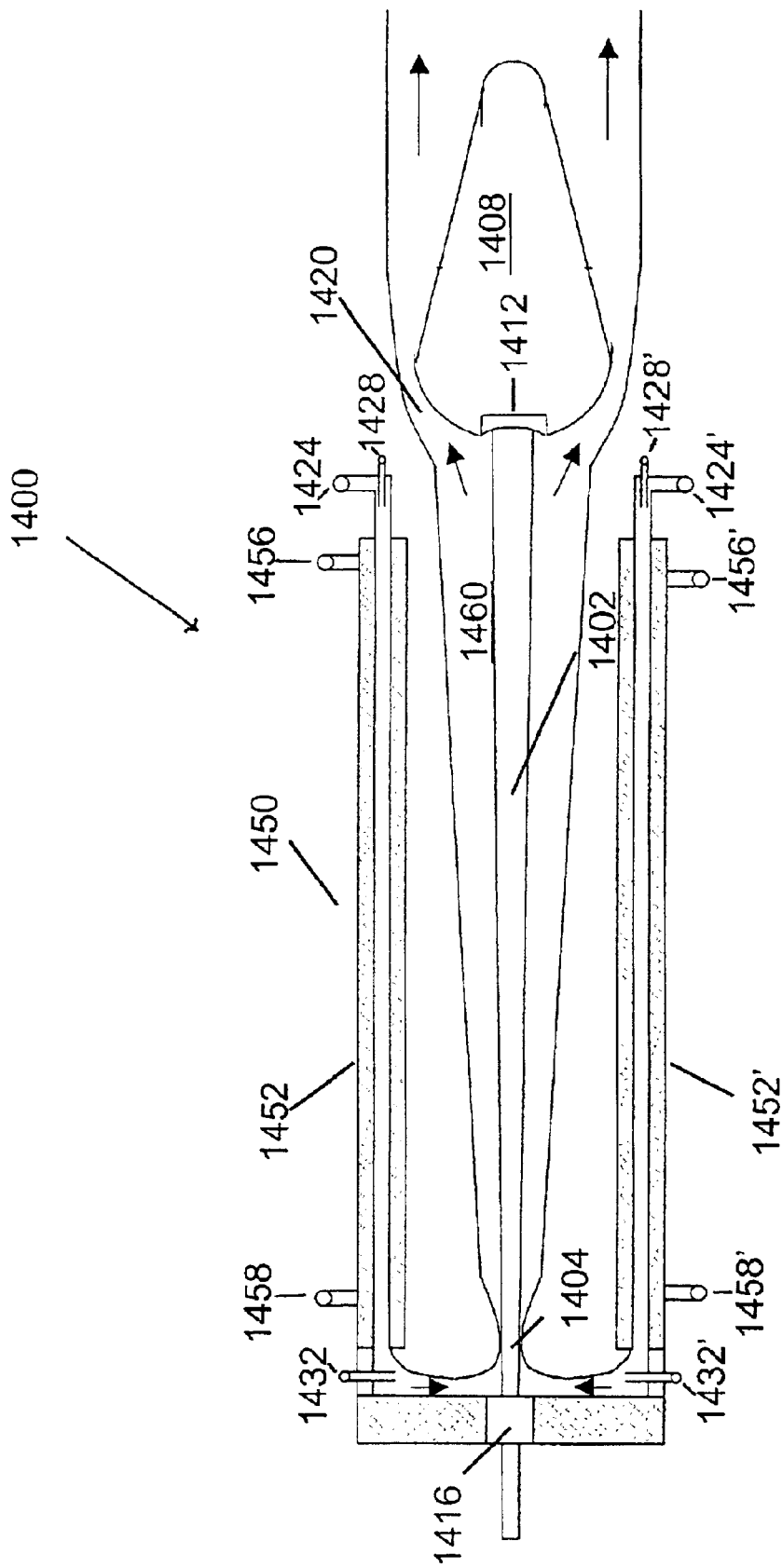
FIG. 13 is a diagrammatic view of an embodiment for producing a beam substantially parallel to the direction of gas flow.

The present invention also includes a laser comprising a gas, a beam produced by the gas and a throat wherein the gas and beam pass through the throat. In one embodiment, the throat comprises a converging region and a diverging region to achieve supersonic flow of gas passing therethrough. A laser according to this gas flow/beam arrangement embodiment 1400 is shown in FIG. 13 (e.g., an axial cross-section through a substantially cylindrical structure). Lasers according to this embodiment are optionally suitable for power outputs of approximately 5 to approximately 20 kW. According to this embodiment, a beam 1402 passes through a gas flow throat 1404. As described in other embodiments herein, this laser 1400 is capable of either closed or open cycle operation and comprises some features of, for example, the laser apparatus shown in FIGS. 8a and 8c. For instance, as shown in FIG. 13, this embodiment comprises at least two oxygen supply ports 1424, 1424', at least two helium supply ports 1428, 1428', at least two iodine supply ports 1432, 1432', an $O_2{}^1\Delta$ electric generator/heat sink assembly 1450, and a resonator cavity 1460. Of course, embodiments comprising a single supply port for oxygen, a single supply port for helium, and/or a single supply port for iodine are within the scope of the present invention, as are headers and/or other distributors for the same. According to one embodiment, oxygen and iodine are supplied at a ratio of approximately 50 to 1. Adjustments to the oxygen to iodine ratio are useful for controlling gain.

The $O_2{}^1\Delta$ electric generator/heat sink assembly 1450 of this particular embodiment comprises at least two tubes 1452, 1452'. Each tube is surrounded by a heat sink or heat exchanger, which optionally provides for flow of a coolant or heat exchange fluid (including gas), as indicated by coolant inlets 1456, 1456' and outlets 1458, 1458'. Of course, the inlets may optionally serve as outlets and vice versa. While the tubes shown in FIG. 13 are substantially parallel to the beam, embodiments comprising tubes that are arranged at other angles with respect to the beam are also within the scope of the present invention. An embodiment comprising at least one annular region that provides for carrying oxygen and/or helium gas is also within the scope of the present invention and a heat sink and/or a heat exchanger for use in such an embodiment optionally comprises an annular cross-section. Further while iodine inlets 1432, 1432' are shown in FIG. 13 positioned perpendicular to the beam axis, an inlet or a plurality of inlets are optionally positioned parallel to the beam axis or at any angle to the beam axis. While not limiting, it is preferred that iodine enters and mixes the gas prior to the throat 1404.

Based on the discussion of other embodiments presented herein (e.g., see discussion of FIG. 8), one of ordinary skill in the art would understand that the embodiment shown in FIG. 13 also comprises a power supply and electrodes. Of course for low pressure operation and other types of operation, the invention does not have to rely on this particular apparatus or method of forming metastable helium. Other methods and apparatus for providing seed volume ionization are within the scope of the present invention and known to those of ordinary skill in the art.

The laser beam of the embodiment shown in FIG. 13 is produced in the resonator cavity 1460. Gases in subsonic flow, mixed with iodine, enter the inlet side of the throat 1404. This mixture of gases expands in the supersonic expansion region of the resonantor cavity to achieve supersonic flow. In a particular embodiment of the invention, gas leaving the throat comprises a velocity of approximately Mach 2.5 to approximately Mach 3. The gas further optionally comprises a temperature of approximately 112 K or lower and/or experiences a pressure drop of approximately one order of magnitude.

While the arrangement shown in FIG. 13 comprises a single beam 1402 that passes through a single gas flow throat 1404 alternative arrangements comprising a plurality of throats and/or a plurality of beams are within the scope of the present invention. In general, the beam diameter 1402 is substantially matched to the diameter of the throat 1404. In the embodiment shown in FIG. 13, the beam 1402 is bound by two mirrors 1412, 1416. One of the mirrors, for example, but not limited to, the left mirror 1416, comprises a partially reflective surface that allows for partial transmission of the beam 1402. Of course, the other mirror 1412 optionally comprises properties that allow for transmission to form, for example, a dual beam apparatus. Alternatively, the left mirror 1416 does not allow for transmission and the right mirror beam is partially reflective. This embodiment further optionally comprises an unstable resonantor, for example, but not limited to, a system wherein at least one mirror comprises an annulus for output of an annular beam.

Figure 14:
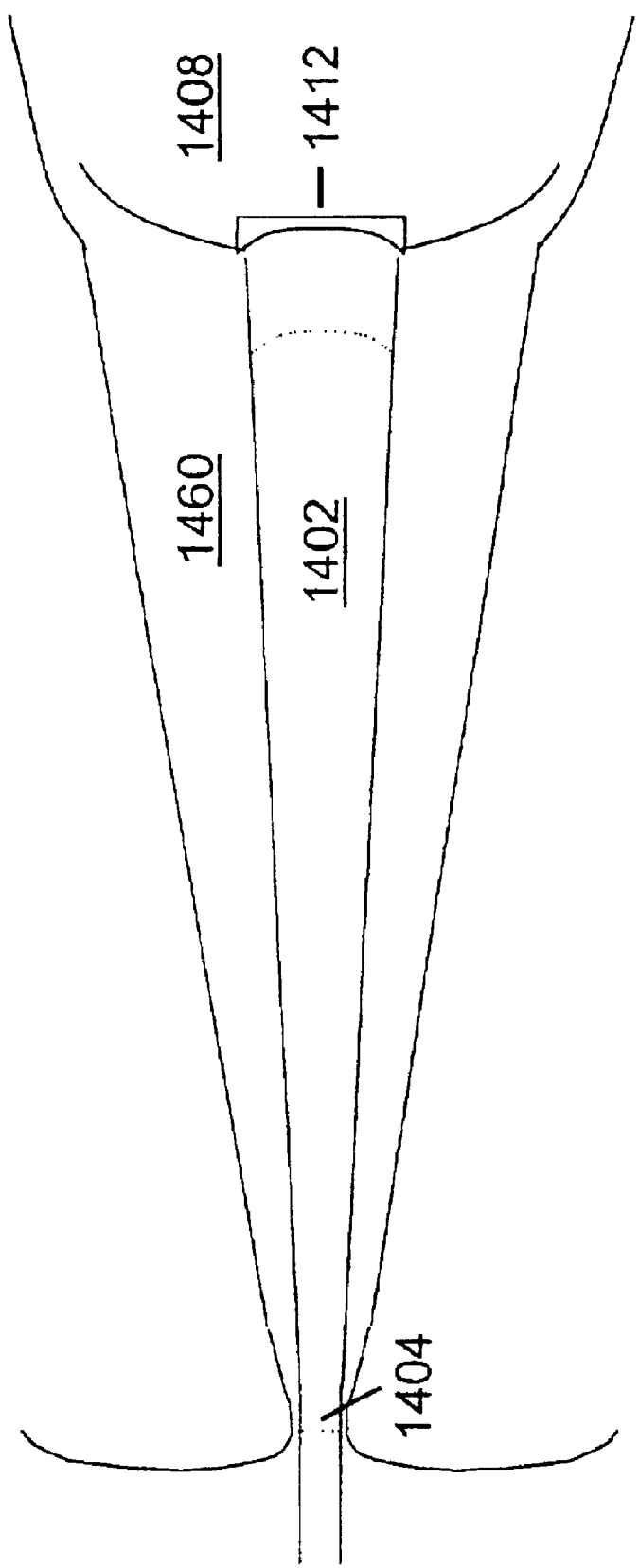
FIG. 14 is a diagrammatic view of a beam of the embodiment shown in FIG. 13.

Referring to FIG. 14, a diagram of a beam 1402 is shown. Note that the beam diameter increases from the throat 1404 to the right mirror 1412. Also note that the right mirror 1412 comprises a concave surface. The surface is concave to account for changes in the phase front (see dotted line near right mirror 1412)—in most instances, the phase front at the throat is substantially flat (see dotted line near throat 1404). Of course, compound elements are optionally used at either end to correct for phase front distortions and/or to focus the beam.

According to one embodiment, the length is sufficient to extract approximately 5% of the energy from the excited gas. The embodiment shown in FIGS. 13 and 14 is generally applicable to any transfer type laser. More specifically, such an beam/cavity arrangement is useful when kinetics allow for the lasing molecule to be recycled many times over the length of the cavity. For example, a transfer molecule (e.g., but not limited to, iodine) may be energized and lased from approximately 10 times to approximately 100 times over the length of the cavity. This allows for gain and, again, is controlable by, for example, adjusting the ratio of lasing molecule to non-lasing molecule(s) in the gas. In one embodiment, the cavity comprises a length from approximately 0.1 to approximately 2 meters.

The throat 1404 of the embodiment shown in FIG. 13 has, for example, characteristics that allow for a particular mass flow rate. Such a throat optionally comprises an upstream converging region and a downstream diverging region. Characteristics of converging, throat and/or diverging regions are useful for providing a particular Mach number, for example, but not limited to, Mach number of approximately 2 to approximately 3. As shown in FIG. 13, the resonator cavity expansion region (from throat 1404 to right mirror 1412) comprises an increasing cross-section. The increasing cross-section helps to account for boundary layer growth, which, in turn, helps to reduce shocking down of the gas in the cavity. While shocking down of the gas in the cavity may be tolerated, in most instances, shockdown occurs in a region removed from the beam path. For example, referring to FIG. 13, shockdown occurs in, or proximate to, a substantially annular region 1420 adjacent to a diffuser structure 1408 that comprises part of a subsonic diffuser. As shown in FIG. 13, the diffuser structure 1408 also optionally comprises the right mirror 1412 or provides an attachment point for such a mirror.

While the above description makes reference to particular values, such as, but not limited to, an E/N value of approximately 180 Td, it is understood to one of ordinary skill in the art that lower E/N values are within the scope of the present invention, for example, approximately 150 Td and below. The above description also makes reference to "plasma" which is used generally to describe a weakly ionized gas, for example, but not limited to, a gas with an electron density between approximately $10^{-2}$ to approximately $10^{15}$ electrons/cm$^3$.

Various embodiments of the present invention are useful for the following areas:

1. Energy and Nuclear Power—cut-up decomissioned reactor vessels, centrifuges, etc.; scabble radioactive layers from cement surfaces; and deep penetration welding, which may be performed robotically in contaminanted areas.
2. Marine and Heavy Equipment Industries—deep penetration welding, cutting and drilling; cladding, surface modification or texturing; removal of corrosion and sea debris, such as barnacles, from marine platforms and barges; and removal of coatings and special, rubber-like layers from vessels, such as, but not limited to, submarines, ships, and barges.
3. Civil Engineering—cleaning bridges, tunnels, outdoor storage tanks (inside and out); road texturing; and tunneling, mining, and rock fracturing.
4. Steel Industry—remove scale from steel rolls and steel roll butt-joint welding.
5. NASA/Space Industry—destruction/removal of space debris; meteor deflection from Earth and other objects; rocket propulsion from ground-based laser or from solar-powered, space-based laser (at any altitude above Earth's surface); deep space communications; and space power transmission.
6. Military Applications—Target designators and ground-based (fixed or mobile), airborne, or space-based weapons.
7. Automobile Applications—reducing emissions from automobile exhaust (as well as any other combustion engine).

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A generator for generating an excited atomic state of a molecule, said generator comprising:

at least one power supply;

a pulse circuit;

an excited atomic state generating region; and a combination electrical excitation generator/heat exchanger;

wherein said pulse circuit discharges via said combination electrical excitation generator/heat exchanger a pulse to a gas in said region and thereby ionizes the gas;

wherein said at least one power supply generates an electric field, thereby generating an excited atomic state of at least one species of molecule in the gas; and wherein said combination electrical excitation generator/heat exchanger prevents the gas from heating beyond approximately 200 degrees Celsius, thereby preventing a significant number of said at least one species of molecule from changing said excited atomic state.

2. The generator of claim 1 wherein said excited atomic state generating region comprises one or more elements selected from the group consisting of a dielectric flow tube with one or more electrodes, a microwave or radio frequency resonant gas flow cavity, a capacitively coupled radio frequency gas flow cavity, an inductive gas flow loop and at least two electrodes and at least one transformer core comprising at least one winding wherein said gas flow loop forms a secondary winding of said at least one transformer core plus at least two electrodes, and an inductive gas flow loop with at least one transformer core which comprises at least two windings, wherein said gas flow loop forms a secondary winding with said at least one transformer core.

3. The generator of claim 1 wherein said generator maintains a level of ionization of at least approximately $10^{12}$ electrons/cm$^3$ in combination with a sustained electric field of less than or equal to approximately 10 Townsends.

4. The generator of claim 1 wherein said pulse circuit discharges pulses of between approximately 5 to 75 nanoseconds in duration.

5. The generator of claim 4 wherein said pulse circuit, after a period of producing initially more elevated pulse discharges, discharges pulses of reduced electric field lying between approximately 80 to 120 Townsends.

6. The generator of claim 4 wherein said pulse circuit discharges pulses at between approximately 25,000 to 100,000 times per second.

7. The generator of claim 1 additionally comprising pre-ionization means selected from the group consisting of burst X-ray means, continual X-ray means, photo-ionization means, metastable helium injection means, and pre-ionized plasma injection means.

8. A method of generating a plasma, the method comprising the steps of:

providing a rapidly flowing gas;

applying an electromagnetic field pulse to the gas to over-volt the gas to an electric field to gas density (E/N) value above ionization breakdown thereby forming a plasma but terminating the pulse before a glow to arc transition can occur; and applying additional electromagnetic field pulses, above an ionization breakdown value of the gas, to sustain quasi-continuous ionization of the gas while simultaneously causing a continuous or quasi-continuous current flow to the gas by applying an additional electric field producing an E/N value in the gas of less than approximately 10 Townsends.

9. A method for producing a laser beam, the method comprising the steps of:

providing a rapidly flowing gas;

applying an electromagnetic field pulse to the gas to over-volt the gas to an electric field to gas density (E/N) value above ionization breakdown thereby forming a plasma;

applying additional electromagnetic field pulses, above an ionization breakdown value of the gas, to sustain quasi-continuous ionization of the gas while simultaneously causing a pump current flow to the gas by applying an additional electric field producing an E/N value in the gas of less than approximately 10 Townsends;

contacting the plasma with at least one molecule of a lasing element thereby disassociating the at least one molecule into atoms and exciting the atoms to an upper electronic state; and lasing the excited atoms.

* * * * *